US007670512B2

(12) United States Patent
Hsu et al.

(10) Patent No.: US 7,670,512 B2
(45) Date of Patent: Mar. 2, 2010

(54) SECOND ORDER NONLINEAR OPTICAL POLYIMIDES HAVING BENZOBISTHIAZOLE-BASED PENDANT GROUPS, AND PREPARATION OF THE SAME

(75) Inventors: Tzu-Chien Hsu, Kaohsiung (TW); Chien-Fan Chen, Kaohsiung (TW); Shou-Shiun Wu, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 229 days.

(21) Appl. No.: 11/475,861

(22) Filed: Jun. 28, 2006

(65) Prior Publication Data

US 2007/0001154 A1 Jan. 4, 2007

(30) Foreign Application Priority Data

Jun. 30, 2005 (TW) .............................. 94122123 A
Jun. 30, 2005 (TW) .............................. 94122124 A

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)

(52) U.S. Cl. ...................... 252/582; 525/420; 525/928; 342/25 R; 544/146; 544/60; 548/228; 548/315.1; 548/428; 548/465; 548/527; 549/59; 549/49; 549/42; 385/12; 528/335

(58) Field of Classification Search ................ 525/420; 252/582; 529/335

See application file for complete search history.

(56) References Cited

U.S. PATENT DOCUMENTS

| | | | |
|---|---|---|---|
| 5,399,664 A | 3/1995 | Peng et al. | |
| 5,433,895 A | 7/1995 | Jeng et al. | |
| 5,532,320 A | 7/1996 | Tripathy et al. | |
| 5,594,093 A | 1/1997 | Sotoyama et al. | |
| 5,676,883 A | 10/1997 | Jeng et al. | |
| 5,688,906 A | 11/1997 | Jen et al. | |
| 5,814,833 A | 9/1998 | Jenekhe | |
| 5,834,575 A | 11/1998 | Honda et al. | |
| 5,837,804 A | 11/1998 | Yamagishi et al. | |
| 6,294,593 B1 | 9/2001 | Jeng et al. | |
| 6,340,506 B1 | 1/2002 | Buchecker et al. | |
| 6,503,998 B2 | 1/2003 | Hsiue et al. | |
| 6,894,169 B1 | 5/2005 | Wang et al. | |

OTHER PUBLICATIONS

Chien-Fan Chen, Synthesis and Characterization of Benzobisthiazole Derived Polymers, Mar. 17, 2004 Ph.D. Dissertation, National Sun Yat-Sen University.*
Donald M. Burland et al., "Second-Order Nonlinearity in Poled-Polymer Systems," Chem. Rev., 1994, vol. 94, pp. 31-75.
L. R. Dalton et al., "Synthesis and Processing of Improved Organic Second-Order Nonlinear Optical Materials for Applications in Photonics," Chem. Mater., 1995, vol. 7, pp. 1060-1081.
Wei Wu et al., "Thermally Stable Second-Order Nonlinear Optical Addition-Type Polyimides Functionalized by Diamine Chromophore," Journal of Polymer Science, Part A: Polymer Chemistry, 1999, vol. 37, pp. 3598-3605.
M. H. Davey et al., "Ultrahigh-Temperature Polymers for Second-Order Nonlinear Optics, Synthesis and Properties of Robust, Processable, Chromophore-Embedded Polyimides," Chem. Mater., 2000, vol. 12, pp. 1679-1693.
K. Van Den Broeck, "High glass transition chromophore functionalised polyimides for second-order nonlinear optical applications," Polymer, 2001 vol. 42, pp. 3315-3322.

(Continued)

*Primary Examiner*—Harold Y. Pyon
*Assistant Examiner*—Bijan Ahvazi
(74) *Attorney, Agent, or Firm*—Finnegan, Henderson, Farabow, Garrett & Dunner, L.L.P.

(57) ABSTRACT

Disclosed herein are second order nonlinear optic polyimide polymers comprising repeating units represented by the formula:

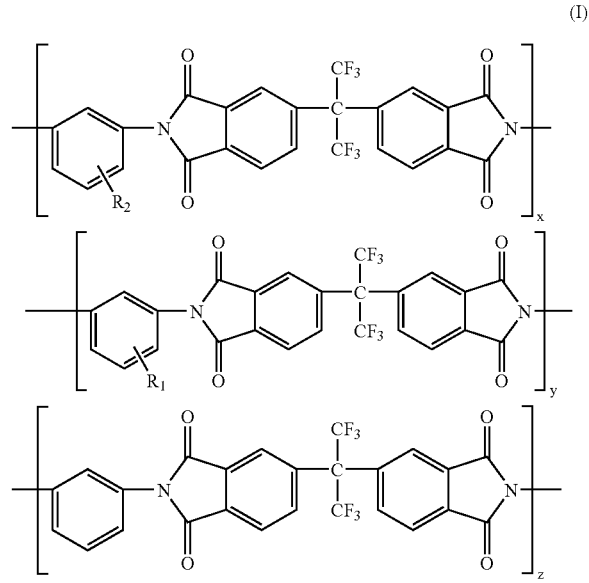

(I)

wherein each of the substituents is given the definition as set forth in the Specification and Claims.

Also disclosed are the preparation processes of these polymers, chromophore-forming compounds for synthesis of these polymers, and the intermediate polymers thereof. The second order nonlinear optic polyimide polymers of formula (I) may be used in the manufacture of electro-optic (EO) devices, such as electro-optic waveguide devices.

33 Claims, 2 Drawing Sheets

OTHER PUBLICATIONS

W. N. Leng et al., "Synthesis of nonlinear nptical polyimides containing benzothiazole moiety and their electro-optical and thermal properties," Polymer, 2001, vol. 42, pp. 9235-9259.

Larry Dalton, "Nonlinear Optical Polymeric Materials: From Chromophore Design to Commercial Applications," Advances in Polymer Science, 2002, vol. 158, pp. 1-86.

Francois Kajzar et al., "Polymeric Materials and their Orientation Techniques for Second-Order Nonlinear Optics," Advances in Polymer Science, vol. 161, pp. 1-85.

Koen Clays et al., "Design Strategies versus Limiting Theory for Engineering Large Second-Order Nonlinear Optical Polarizabilities in Charged Organic Molecules," Chem. Mater., 2003, vol. 15, pp. 642-648.

Seung-Hwan Lee et al., "Novel rigid-rod, 2,6-diphenylbenzo[1,2-d:4,5-d']bisthiazole (DPBBT) derivatives for second-order nonlinear optical chromophores†," J. Mater. Chem., 2002, vol. 12, pp. 2187-2188.

Weinan Leng et al., "Synthesis and Characterization of Nonlinear Optical Side-Chain Polyimides Containing the Benzothiazole Chromophores," Macromolecules, 2001, vol. 34, pp. 4774-4779.

M. Hasegawa et al., "Photophysics, photochemistry, and optical properties of polyimides," Prog. Polym. Sci., 2001, vol. 26, pp. 259-335.

T. D. Kim et al., "Synthesis and characterization of a novel polyimide-based second-order nonlinear optical material," Polymer, 2000, vol. 41, pp. 5237-5245.

Yoshimasa Sakai et al., "Synthesis and Properties of a Second-Order Nonlinear Optical Side-Chain Polyimide," Journal of Polymer Science Part A: Polymer Chemistry, 1999, vol. 37, pp. 1321-1329.

Hong-Quan Xie et al., "Nonlinear optical crosslinked polymers and interpenetrating polymer networks containing azo-benzothiazole chromophore groups," Polymer, 1998, vol. 39, pp. 2393-2398.

Dong Yu et al., "Novel Aromatic Polymides for Nonlinear Optics," J. Am. Chem. Soc., 1995, vol. 117, pp. 11680-11686.

S. R. Marder et al., "Approaches for Optimizing the First Electronic Hyperpolarizability of Conjugated Organic Molecules," Science, Apr. 5, 1991, vol. 252, pp. 103-106.

John A. Osaheni et al., "Synthesis and Processing of Heterocyclic Polymers as Electronic, Optoelectronic, and Nonlinear Optical Materials. 1. New Conjugated Rigid-Rod Benzobisthiazole Polymers," Chem. Mater., 1992, vol. 4, pp. 1282-1290.

Masaki Matsui et al., "Second-Order Optical Nonlinearity of 6-(Perfluoroalkyl)benzothiazolylazo Dyes," Dyes and Pigments, 1998, vol. 38, Nos. 1-3, pp. 57-64.

C. C. Chen et al.,"Diacid architecture effect on the synthesis and microstructure of rigid-rod poly(benzobisimidazoles," Journal of Materials Science, 2002, vol. 37, pp. 4109-4115.

C. F. Chen et al.,"Diacid Architecture Effect on the Synthesis and Microstructure of Rigid-rod Poly(benzobisthiazoles)," http://polymer.che.ncku.edu.tw/papers/B-Functional/B104.pdf.

James F. Wolfe et al., "Rigid-Rod Polymers. 2. Synthesis and Thermal Properties of Para-Aromatic Polymers with 2,6-Benzobisthiazole Units in the Main Chain[1]," Macromolecules, 1981, vol. 14, pp. 915-920.

Tatsuya Hattori et al., "Novel Two-Step Synthesis of Poly(benzothiazoles) via New Precursor Polyamides from 2,5-Bis(cyanoethyl)thio]-1,4-phenylenediamine and Aromatic Dicarboxylic Acid Chlorides," Macromolecules, 1993, vol. 26, pp. 4089-4093.

Yoshito Shuto et al., "Reflection measurement technique of electro-optic coefficients in lithium niobate crystals and poled polymer films," J. Appl. Phys., May 1, 1995, vol. 77 (9), pp. 4632-4638.

H. J. Cha et al., "Structures and dielectric properties of thin polyimide films with nano-foam morphology," Appl. Phys. Lett., Apr. 1, 1996, vol. 68 (14), pp. 1930-1932.

A. R. Forouhi, "Calculation of Optical Constants, n and k, in the Interband Region," Handbook of Optical Constants of Solids II, Academic Press, 1991, pp. 151-175.

R. Swanepoel, "Determining refractive index and thickness of thin films from wavelength measurements only," J. Opt. Soc. Am. A., Aug. 1985, vol. 2, No. 8, pp. 1339-1343.

* cited by examiner

SECOND ORDER NONLINEAR OPTICAL POLYIMIDES HAVING BENZOBISTHIAZOLE-BASED PENDANT GROUPS, AND PREPARATION OF THE SAME

CROSS-REFERENCE TO RELATED APPLICATIONS

This application claims priority of Taiwanese application No. 094122123, filed on Jun. 30, 2005, and Taiwanese application No. 094122124, filed on Jun. 30, 2005.

BACKGROUND OF THE INVENTION

1. Field of the Invention

The present invention relates to second order nonlinear optical (NLO) polyimides having benzobisthiazole-based pendant groups and processes for preparing the same, as well as chromophore moiety-forming compounds that may be used to form the benzobisthiazole-based pendant groups of said second order NLO polyimide polymers.

2. Description of the Related Art

Electro-optics is a property whereby materials change the refractive index thereof upon the application of an electric field. This change in refractive index affects the way the materials interact with light. Information is more rapidly processed and transmitted using optical signals than electrical signals. There exists a need for finding materials that alter the transmission of optical signals or serve to couple optical devices to electrical devices, i.e., electro-optic (EO) devices. Materials suitable for use in EO devices should possess nonlinear optical (NLO) properties with large electro-optic coefficients at the desired telecommunication wavelengths. Telecommunication wavelengths are those prescribed by some standard setting body such as the International Telecommunications Union (ITU).

Electro-optic waveguide devices are essential components of the emerging field of integrated optics. Electro-optic waveguide devices can be passive waveguide devices or functional waveguide devices. Examples of passive waveguide devices include optical beam-dividers, polarizers and the like. Examples of functional waveguide devices include phase modulators, Mach-Zehnder modulators, and the like. Generally, electro-optic waveguide devices, or optical waveguides in short, consist of a transparent waveguiding core ("guiding layer") surrounded by a layer of transparent material ("cladding layer"). The guiding layer serves the important function of interacting with and affecting the propagation of light. Materials that form the guiding layer have been traditionally inorganic materials such as lithium niobate ($LiNbO_3$), potassium dihydrogen phosphate ($KH_2PO_4$), ammonium dihydrogen phosphate and the like. These are typically single crystal materials, and lack processing capabilities. In recent years, polymeric NLO materials have seen increased application as guiding layers. Generally, polymeric NLO materials can or may have specific advantages, such as fast response time, small dielectric constant, good linear optical properties, large nonlinear optical susceptibilities, high damage threshold, engineering capabilities, and ease of fabrication.

With the advancement in the optoelectronics industry, a great number of materials for optical transmission have been developed and studied. Further, with the finding of nonlinear optical effects, researchers and manufacturers in the art have altered their primary research topic toward the exploitation of nonlinear optical materials, which inherently have the ability to alter the frequency or color of a light beam and/or the ability to photocouple at least two light beams to result in an increase/decrease in frequency and/or amplitude.

In general, nonlinear optical (NLO) materials may be classified into two categories: inorganic materials and organic materials. Examples of inorganic nonlinear optical materials include quartz, potassium dihydrogen phosphate, lithium niobate, cadmium sulfide, cadmium telluride, etc. While inorganic nonlinear optical materials have the advantages of high transparency, high nonlinear optical coefficient and high anti-abrasion property, they bear the disadvantages of high cost, difficulty in single crystal growth, low compatibility with other optical elements and so forth, thus greatly limiting the applications and development thereof. Therefore, in recent years, researchers and manufacturers in the art have endeavored to investigate and develop high polymer materials that exhibit second-order nonlinear optic properties.

Nonlinear optical (NLO) polymers with good thermal stability have been intensively studied in the past decades. These materials have potential applications in areas such as telecommunications and optical information processing (D. M. Burland et al. (1994), *Chem Rev,* 94: 31-75; L. R. Dalton et al. (1995), *Chem Mater,* 7: 1060-1081; W. Wu et al. (1999), *J Polym Sci,* Part A: Polym Chem, 37: 3598-3605; M. H. Davey et al. (2000), *Chem Mater,* 12: 1679-1693; K. V. D. Broeck et al. (2001), Polymer, 42: 3315-3322; W. N. Leng et al. (2001), *Polymer,* 42: 9253-9259; L. R. Dalton (2002), *Adv Polym Sci,* 158: 1-86; F. Kajzar et al. (2003), *Adv Polym Sci,* 161: 1-85; K. Clays et al. (2003), *Chem Mater,* 15: 642-648; S.-H. Lee et al. (2002), *J Mater Chem,* 12: 2187-2188; W. Leng et al. (2001), *Macromolecules,* 34: 4774-4779; M. Hasegawaa et al. (2001), *Prog Polym Sci,* 26: 259-335).

NLO polymers have several advantages over single crystalline inorganic and organic molecular systems. These include ease of preparation, adjustable refractive indices and controlled arrangement of spatial order. For second order applications, it is imperative that the material be noncentrosymmetric. In noncentrosymmetric organizations, several organic molecular and polymeric systems have been characterized by large second order NLO coefficients, ultra-fast response times, performance over a broad wavelength range and high laser damage threshold, as compared to the traditional inorganic materials, e.g., lithium niobate or potassium dihydrogen phosphate.

NLO polymers can be cast as films on substrates by processes such as spin coating from a solution of the polymer in a solvent, spraying, Langmuir-Blodgett deposition, and the like. The substrate materials employed for electro-optic waveguide devices are generally inorganic materials such as silicon, GaAs, GaAlAs and the like. Silicon is particularly preferred as substrate material due to its ready availability in wafer form in a well-purified state, and the highly-developed state of its technology in integrated circuit and electronics industries. Wafers from silicon also have the advantage that they can be easily cleaved into minute chips carrying the individual devices.

Many of the current organic polymeric NLO materials are prepared by blending a NLO molecule into a polymeric host material. The term "blending" as used herein means a combination or mixture of materials without significant reaction between specific components. However, a problem associated with "guest-host" polymers with NLO properties produced by a simple-blending of NLO molecules into a host polymer is that these polymer materials lack stability of orientation. Generally, the incorporation of molecular structures having NLO activity into the backbone of a polymer chain will decrease the likelihood of the structural reorganization in comparison with polymers in which the NLO active molecule is simply blended. It is therefore desirable to provide a polymer material with NLO groups covalently bonded to the backbone thereof to minimize relaxation effects.

A number of approaches have been made in the past decades to organize NLO molecules in a polymer matrix in a noncentrosymmetric manner. The most important, but not the only aspect from the standpoint of application, is the organization of NLO molecules into preferred orientation and their stability in the aligned state up to at least cold wire bond temperatures (about 100° C.). Historically, one of the first approaches to this alignment of NLO molecules in a polymeric system came with the concept of the guest-host system. The NLO molecules may be incorporated by a solution casting method with an amorphous polymer, and the second order non-linearity may be imparted by subsequent poling of the NLO molecules in the polymer matrix using an external electric field, e.g., corona poling, parallel plate poling or integrated electrode poling. Advantages of this approach are ease of processing, tailorable refractive indices, control of spatial ordering of the polymer, and choice of a wide range of materials. However, the decay (both the initial and long term) of second order properties as confirmed through second harmonic generation (SHG) from the polymer matrix is unavoidable when the poling field is withdrawn from the polymer matrix. Moreover, a high degree of loading of the NLO molecules into the host polymer is not possible because of phase segregation of the polymer matrix or blooming of NLO molecules in the matrix, both resulting in optical scattering.

In a second approach, known as "grafted" systems, a number of new features are routed just by linking NLO molecules covalently in the side chains of a suitable polymer backbone. Despite the synthetic complexity of such a system, a large number of NLO molecules (a concentration 2 to 3 times greater than that in the guest-host system) can be coupled with the polymer side chains, and the polymers are still easily processable. Both the initial and long term decay in second harmonic (SH) properties are reduced to a great extent.

A three dimensional network consisting of NLO molecules, known as the "cross-linked" system, has been developed to overcome a number of problems associated with the guest-host or grafted systems. In this system, multifunctional epoxy and amino compounds containing NLO components are simultaneously processed, poled and cross-linked to freeze-in the nonlinear effects permanently. Properties resulting from the cross-linked system are significantly small decay in SH properties over a long period of time and the ability for processing with large concentrations of NLO molecules. However, to develop an optimal epoxy-based NLO material, precise control of the molecular weight of the prepolymer is a stringent and necessary condition. In addition, poling and curing at elevated temperatures have to be carried out over a long period of time (about 20 hours), making processing of the materials significantly difficult.

There are other nonlinear optical polymers, which contain nonlinear optical moieties that form parts of the polymer backbone or are appended to the polymer backbone through intervening spacer groups. Nonlinearity of moieties is described in terms of second order nonlinearity, third order nonlinearity, and so on, with the corresponding unit values being referred to as second order nonlinear optical susceptibility, third order nonlinear optical susceptibility, and so on. Nonlinear optical moieties of polymers that are preferred to act as guiding layers in optical waveguide devices generally must possess acceptable second order nonlinear activity. These moieties are generally made up of conjugated π-electron systems with an electron donating group such as an amine group, and an electron-acceptor group such as a nitro group forming either end of the conjugated π-electron system.

Second order nonlinear optical (NLO) polymers are expected to find extensive uses in opto-electronic applications. For example, a number of applications, such as second harmonic generation (SHG), frequency mixing, electro-optic modulation, optical parametric emission, amplification and oscillation have been proposed for organic and polymeric materials with large second order NLO coefficients.

Although second order nonlinear optical (NLO) polymers hold promise for applications in electro-optical devices, a number of issues have to be addressed before they can see wider commercial application. Three of these crucial issues are the high temporal stability of dipole orientation, large optical nonlinearity and minimum optical loss. Due to a realization of the intrinsic nature of the optical loss (due to C—H overtone vibration absorption), major research efforts have been focused on optimizing the optical nonlinearity and stabilizing the dipole orientation.

Different approaches have been undertaken to address these issues, and considerable progress has been achieved. For example, various cross-linking schemes (photochemical and thermal cross-linking) have been developed to lock the dipole orientation in the polymer matrix after electric poling. Temporal stabilities of second order NLO activity thus have been enhanced. The rationale behind the design of these polymers is that after cross-linking, the motion of the free volume in the polymer matrix can be frozen. This is reflected in the increase in glass transition temperatures of the resultant NLO polymers. The same notion leads to the concept that as long as a polymer has a high glass transition temperature, the induced dipole orientation can be stabilized within a certain temperature range. This was clearly demonstrated in second order NLO polyimide composite materials.

For example, in U.S. Pat. No. 5,399,664 issued to Zhonghua Peng and Luping Yu, polymers that exhibit second order nonlinear optical properties and characterized by high-temperature stability are disclosed to be prepared by a polycondensation reaction between an aromatic dianhydride and a compound selected from the group consisting of a di(alkylamino)amine and an aromatic diamine. According to this US patent, a most preferred polymer is a product of a polycondensation reaction between 1,2,4,5-benzenetetracarboxylic dianhydride and nitro(N,N-diethylamino)stilbene. Said polymer can then be heated under conditions sufficient to form a polyimide polymer.

U.S. Pat. No. 5,433,895 and U.S. Pat. No. 5,676,883 issued to Ru J. Jeng et al. disclose a nonlinear optical composition which includes a silicon-containing component and a nonlinear optical component, wherein the nonlinear optical component includes an alkoxy-silane azo dye. In these two US patents, there is also disclosed a method for forming a nonlinear optical composition, comprising the steps of: (a) forming a sol of an alkoxy-silane compound that includes a nonlinear optical component; (b) exposing the sol to conditions sufficient to form a gel; (c) poling the nonlinear optical component, whereby a nonlinear optical composition is formed which exhibits nonlinear optical activity; and (d) exposing the gel to conditions sufficient to cause transesterification of the alkoxy-silane compound, thereby forming the nonlinear optical composition.

In connection with polymers having NLO properties and their uses in fabricating optical elements, available references include, but are not limited to, U.S. Pat. Nos. 5,532,320, 5,594,093, 5,688,906, 5,814,833, 5,834,575, 5,837,804, 6,294,593 B1, U.S. Pat. No. 6,340,506 B1, U.S. Pat. No. 6,503,998 B2, U.S. Pat. No. 6,894,169 B1, etc.

There is a continuing effort to develop new nonlinear optical polymers with increased nonlinear optical susceptibilities and enhanced stability of nonlinear optical effects, in particular second-order NLO polymeric materials.

Several factors are required for the practical application of second-order NLO polymeric materials, including large molecular hyperpolarizability ($\beta$), and satisfactory optical transparency, photochemical and thermal stability. The NLO polymeric materials must exhibit high thermal and oxidative stability, low optical loss, good processability and low chain segment mobility.

Amongst NLO polymers with side-chain chromophores, polyimide is a good candidate due to its high chain stiffness, and good thermal and high oxidative stability, making it possible to maintain the orientational stability of side-chain chromophores (D. M. Burland et al. (1994), *Chem Rev*, 94: 31-75; W. Wu et al. (1999), *J Polym Sci*, Part A: Polym Chem, 37: 3598-3605; M. H. Davey et al. (2000), *Chem Mater*, 12: 1679-1693; K. V. D. Broeck et al. (2001), Polymer, 42: 3315-3322; W. N. Leng et al. (2001), *Polymer*, 42: 9253-9259; T. D.

Kim et al. (2000), *Polymer,* 41: 5237-5245; Y. Sakai et al. (1999), *J Polym Sci,* Part A: Polym Chem, 37: 1321-1329; H. Q. Xie et al. (1998), *Polymer,* 39: 2393-2398; D. Yu et al. (1995), *J Am Chem Soc,* 117: 11680-11686). These chromophores can be conveniently incorporated into the polymer backbone after being poled at elevated temperatures. Several NLO polyimides based on 4,4'-(hexafluoroisopropylidene) diphthalic anhydride (6FDA) and some chromophore-containing diamines have been reported in various literature (see, e.g., M. H. Davey et al. (2000), *Chem Mater,* 12: 1679-1693; K. V. D. Broeck et al. (2001), Polymer, 42: 3315-3322; W. N. Leng et al. (2001), *Polymer,* 42: 9253-9259; H. Q. Xie et al. (1998), *Polymer,* 39: 2393-2398; D. Yu et al. (1995), *J Am Chem Soc,* 117: 11680-11686). It is also well known in the art that the presence of the $CF_3$ group in the backbone chains of polyimide polymers can greatly improve the solubility of said polymers in organic solvents. Such fluorinated NLO polyimide polymers also exhibit good processability for film casting.

The molecular design of a NLO chromophore should contain an electron donor, a π-electron connective bridge, and an electron acceptor (D. M. Burland et al. (1994), *Chem Rev,* 94: 31-75; L. R. Dalton et al. (1995), *Chem Mater,* 7: 1060-1081). The optical nonlinearity of a chromophore can be evaluated by μβ value from -simple calculation with two-level mode, where μ is the difference between the dipole moment between the ground and excited state (D. M. Burland et al. (1994), supra). During the 1980s, most researchers focused on finding stronger donor and acceptor groups and on increasing the length of the π-electron connective bridge (L. R. Dalton et al. (1995), supra).

However, in 1991, S. R. Marder and his co-workers demonstrated that an increase in the donor-acceptor strength would lead to a diminution of hyperpolarizability (S. R. Marder et al. (1991), *Science,* 252: 103-106). They then focused on two design factors in optimizing hyperpolarizability: firstly, a chromophore should have a π-electron connective bridge that loses aromaticity upon polarization, and an acceptor that gains aromaticity upon polarization, so that the bond length alternation of the π-electron connective bridge could be reduced, resulting in a significant enhancement in μβ values; and secondly, the optical nonlinearity could be improved by replacing benzene rings with heterocyclic rings such as thiazole or thiophene, the structures of which have less aromatic stabilization energy, so that chromophores containing the same in the π-electron connective bridge(s) could have larger μβ values than those containing two benzene rings.

Considerable efforts to incorporate benzothiazole-derived chromophores into polyimides as side chains have been made. These benzothiazole-based polyimides exhibited attractive NLO activities and good thermal stability (W. N. Leng et al. (2001), *Polymer,* 42: 9253-9259; Y. Sakai 5 et al. (1999), *J Polym Sci,* Part A: Polym Chem, 37: 1321-1329; H. Q. Xie et al. (1998), *Polymer,* 39: 2393-2398).

For example, in W. N. Leng et al. (2001), *Polymer,* 42: 9253-9259, there is disclosed a NLO polyimide polymer with side-chain chromophores, which was prepared from the following reaction:

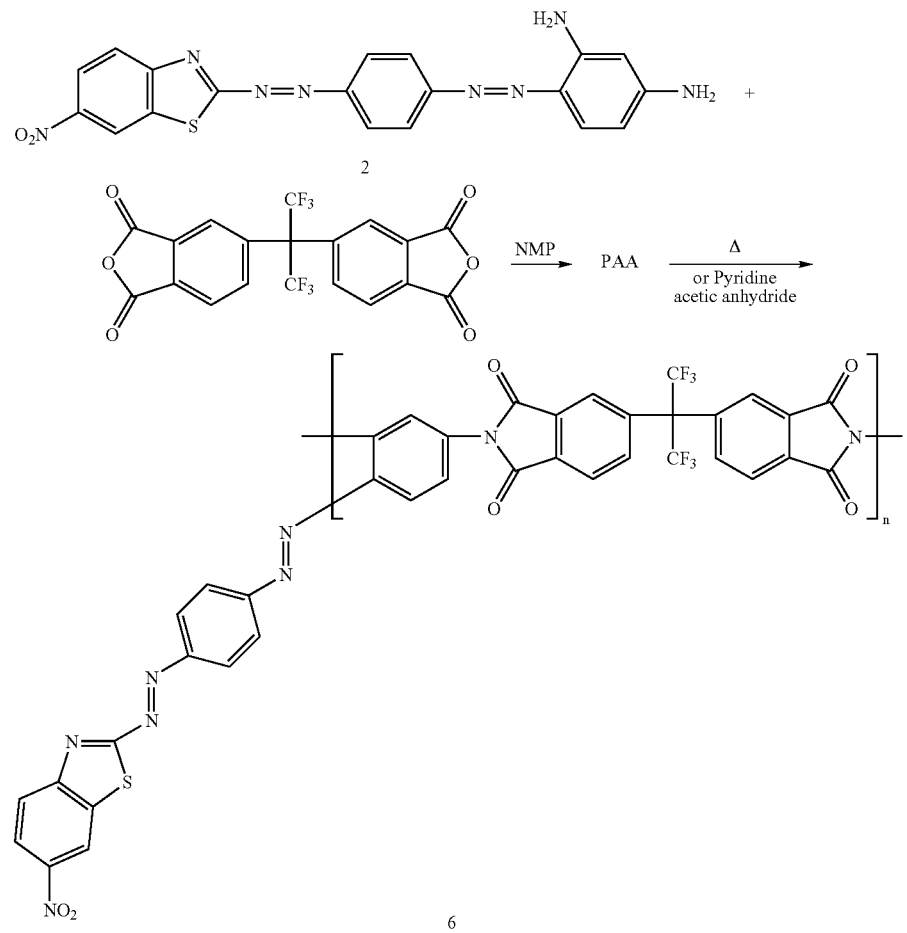

Said NLO polyimide polymer was found to have an electro-optic coefficient ($r_{33}$) of 22 pm/V at 830 nm and a glass transition temperature (Tg) of 248° C. However, due to the presence of azo group in the pendant chromophore, the NLO polyimide polymer has poor thermal stability and the second order nonlinear optical property thereof will be drastically reduced and may even be lost at high temperatures.

Polymers other than polyimides have also been considered. For example, it was reported that poly(p-phenylenebenzobisthiazole) (PBZT) has promising nonlinear optical properties (J. A. Osaheni et al. (1992), *Chem Mater,* 4: 1282-1290). In addition, it was reported that poly(methyl methacrylate) (PMMA) containing 2 mol % of 6-(perfluoroalkyl)benzothiazolylazo dye has a larger second-order nonlinear optical coefficient ($d_{33}$) than PMMA with the same loading amount of Disperse Red 1 (DR 1) dye (M. Matsui et al (1998), *Dyes and Pigments,* 38 (1): 57-64).

On the other hand, in connection with the studies of chromophores, S.-H. Lee and his co-workers synthesized a series of planar rigid-rod push-pull 2,6-diphenylbenzo[1,2-d:4,5-d']bisthiazole (DPBBT) derivatives, using 2,5-diamino-1,4-benzenedithiol dihydrochloride as the starting material:

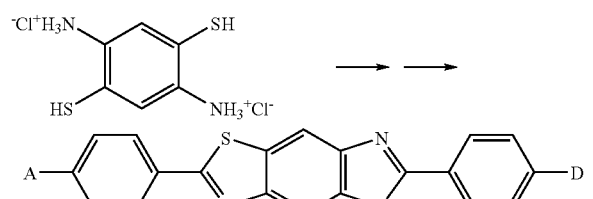

wherein A represents CN or $NO_2$, and D represents $N(CH_3)_2$ or $N(CH_3CH_2)_2$.

The above derivatives were reported to be thermally stable, to have highly efficient second-order nonlinear optical nonlinearities, and to exhibit optical transparency down to 532 nm (S.-H. Lee et al. (2002), *J Mater Chem,* 12: 2187-2188). However, these derivatives are not susceptible of industrial applications due to the poor solubility thereof. Therefore, some investigators in the art have endeavored to modify the molecular structures of such chromophores or utilize the same in the studies of NLO polymeric materials.

In earlier studies of the applicants, six poly(benzobisimidazoles) (PBIs) and six poly(benzobisthiazoles) (PBTs) were synthesized by the solution polycondensation of 1,2,4,5-tetraaminobenzene tetrahydrochloride (C. C. Chen et at (2002), *J. Mater. Sci.,* 37 (19): 4109-4115) and 2,5-diamino-1,4-benzenedithiol (http://polymer.che.ncku.edu.tw/papers/B-Functional/B104.pdf) with systematically varied diacids in poly (phosphoric acid) (PPA), respectively. Based on the findings from these studies, the applicants endeavored to design new second order NLO polymers that are easy to prepare, that have a glass transition temperature (Tg) greater than 200° C., and that exhibit satisfactory NLO properties.

SUMMARY OF THE INVENTION

Therefore, according to a first aspect, this invention provides a second order nonlinear optic polyimide polymer comprising repeating units represented by the formula:

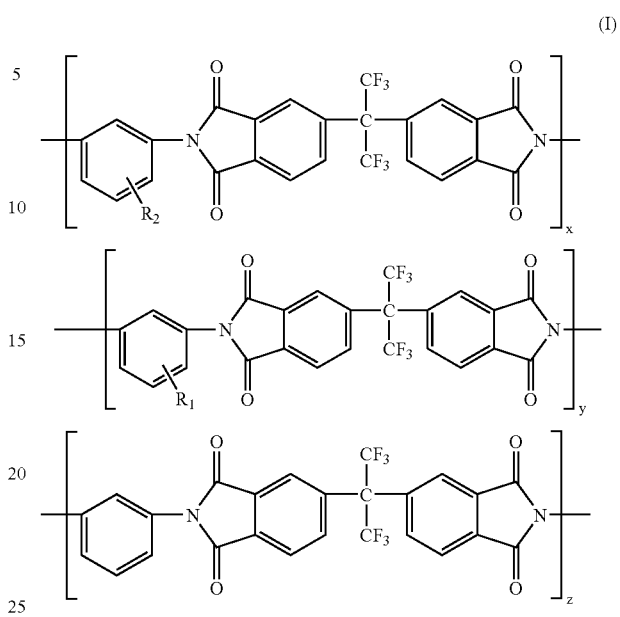

wherein:

$R_1$ is a functionality group selected from —OH and —COOH;

when $R_1$ is —OH, $R_2$ is a group represented by the formula:

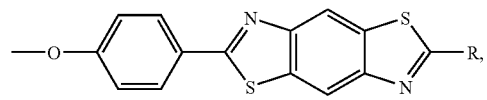

when $R_1$ is —COOH, $R_2$ is a group represented by the formula:

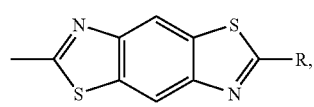

wherein R is a phenyl or styryl group that is 3-substituted with a group selected from —$NO_2$, —$COCH_3$, —CN, —$SO_2NH_2$, Br and Cl; and x+y+z=100% of the repeating units, x is at least 1%, and either or both of y and z can be zero.

In a second aspect, this invention provides an intermediate polyimide polymer comprising repeating units represented by the formula (I'):

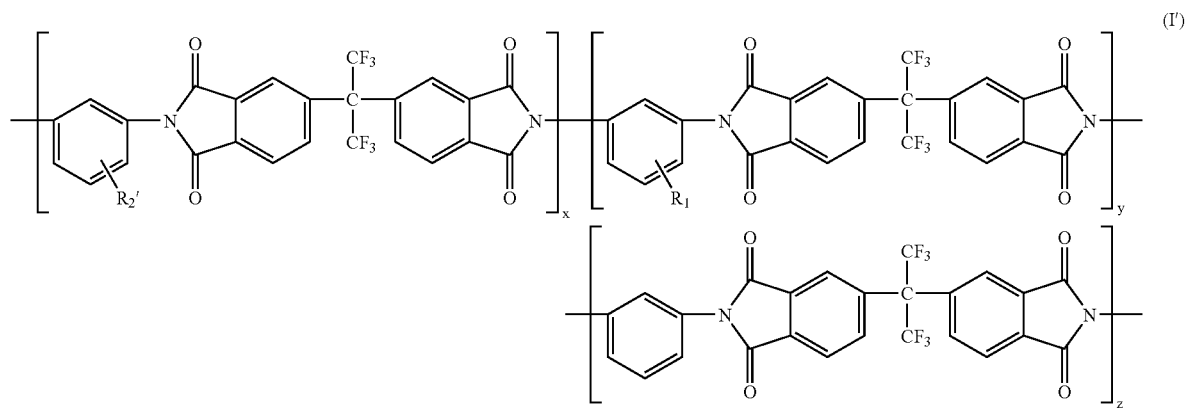

wherein:

R₁ is a functionality group selected from —OH and —COOH;

when R₁ is —OH, R₂' is a group represented by the formula:

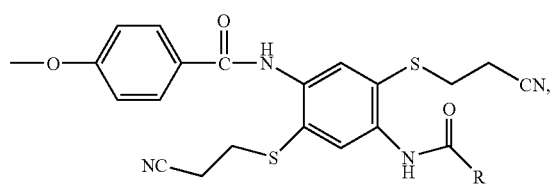

when R₁ is —COOH, R₂' is a group represented by the formula:

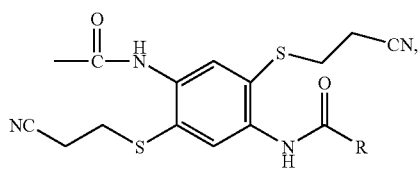

wherein R is a phenyl or styryl group that is 3-substituted with a group selected from —NO₂, —COCH₃, —CN, —SO₂NH₂, Br and Cl; and x+y+z=100% of the repeating units, x is at least 1%, and either or both of y and z can be zero.

According to this invention, the second order nonlinear optic polyimide polymer of formula (I) can be produced by curing the intermediate polyimide polymer of formula (I'), which may be formed by grafting a host polyimide polymer with a chromophore moiety-forming compound.

Therefore, in a third aspect, this invention provides a compound of formula (C1):

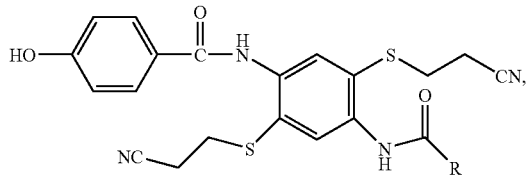

wherein R is a phenyl or styryl group that is 3-substituted with a group selected from —NO₂, —COCH₃, —CN, —SO₂NH₂, Br and Cl.

In a fourth aspect, this invention provides a compound of formula (C2):

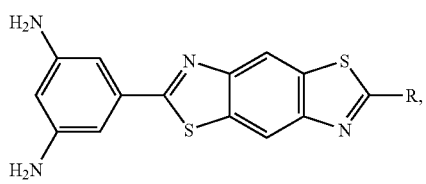

wherein R is a phenyl or styryl group that is 3-substituted with a group selected from —NO₂, —COCH₃, —CN, —SO₂NH₂, Br and Cl.

In a fifth aspect, this invention provides a compound of formula (C3):

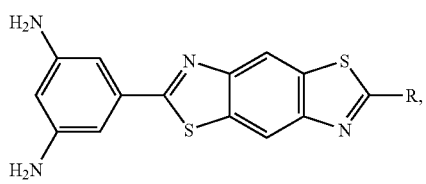

wherein R is a phenyl or styryl group that is 3-substituted with a group selected from —NO₂, —COCH₃, —CN, —SO₂NH₂, Br and Cl.

In a sixth aspect, this invention provides a process for preparing the second order nonlinear optic polyimide polymer of formula (I) as described above, the process comprising the steps of:
reacting 4,4'-(hexafluoroisopropylidene)diphthalic anhydride with a compound of formula

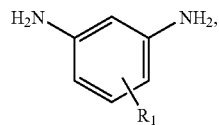

wherein $R_1$ is the same as that defined for formula (I), optionally in the presence of m-phenylenediamine, so as to form a host polyimide polymer comprising repeating units represented by the formula:

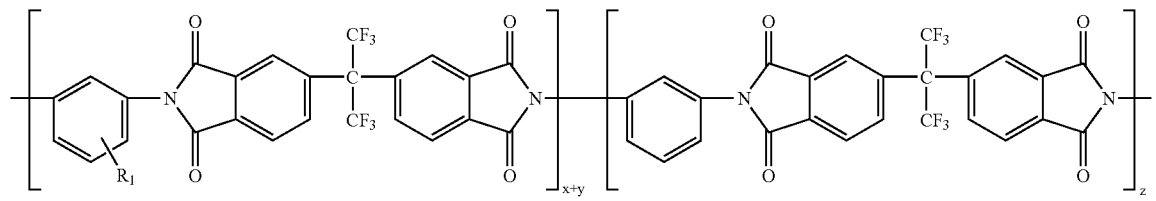

wherein $R_1$, x, y and z are the same as those defined for formula (I); and
grafting the thus-formed host polyimide polymer with a compound of formula $R_2"$—H so as to form an intermediate polyimide polymer comprising repeating units represented by the formula (I'), which is processible to form the second order nonlinear optic polyimide polymer of formula (I):

wherein:
$R_1$, x, y and z are the same as those defined for formula (I);
when $R_1$ is —OH, $R_2"$ and $R_2'$ are the same and represent a group of formula

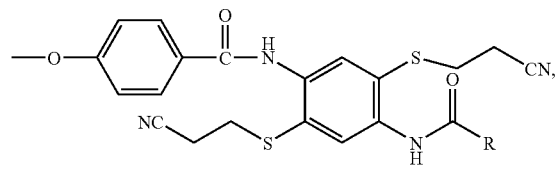

when $R_1$ is —COOH, $R_2"$ represents a group of formula

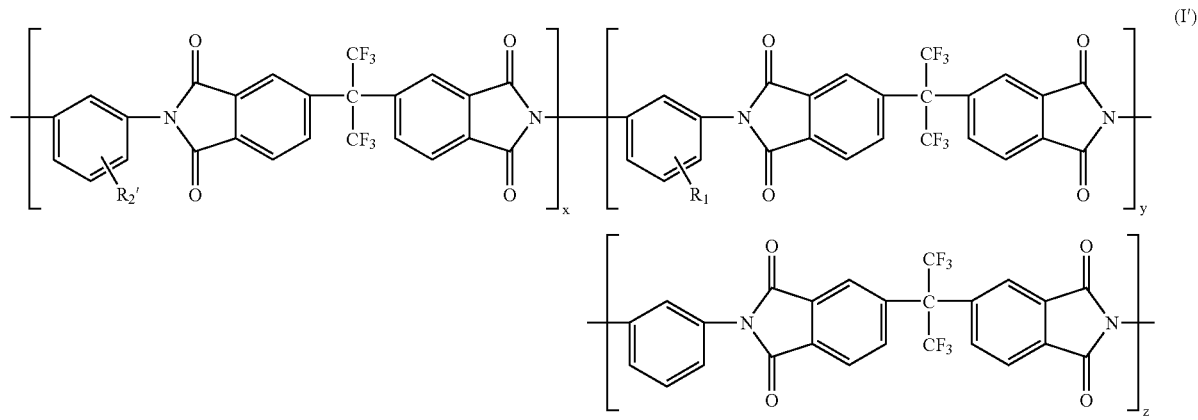

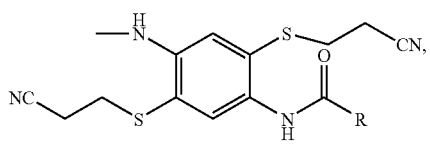

and R$_2$' represents a group of formula

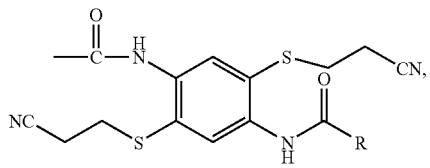

wherein R is a phenyl or styryl group that is 3-substituted with a group selected from —NO$_2$, —COCH$_3$, —CN, —SO$_2$NH$_2$, Br and Cl.

The thus-formed intermediate polyimide polymer of formula (I') can subsequently be cured to form the desired second order nonlinear optic polyimide polymer of formula (I) as described above.

In a seventh aspect, this invention provides a second order nonlinear optic polyimide polymer comprising repeating units represented by the formula (II):

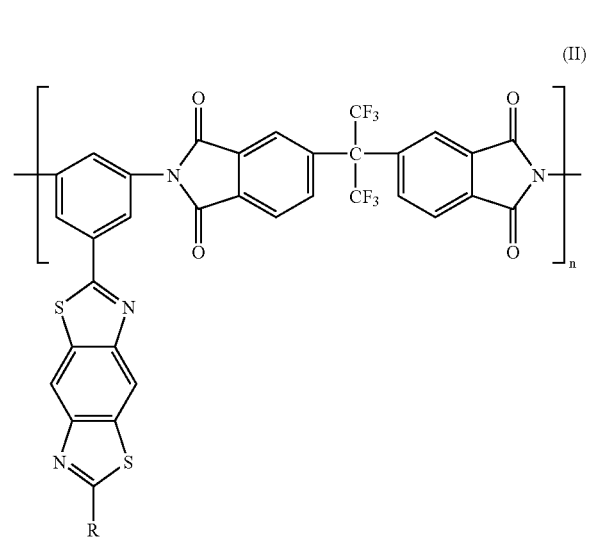

wherein:

R is a phenyl or styryl group that is 3-substituted with a group selected from —NO$_2$, —COCH$_3$, —CN, —SO$_2$NH$_2$, Br and Cl; and n is an integer greater than 1.

In an eighth aspect, this invention provides a polyamic acid comprising repeating units represented by the formula (II'):

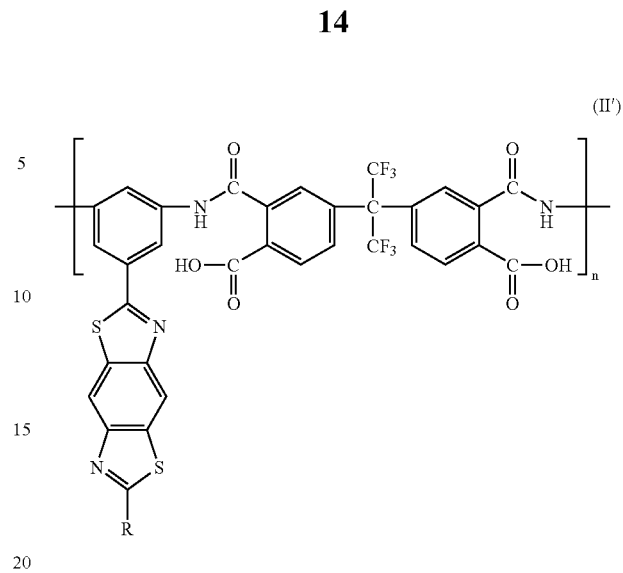

wherein:

R is a phenyl or styryl group that is 3-substituted with a group selected from —NO$_2$, —COCH$_3$, —CN, —SO$_2$NH$_2$, Br and Cl; and n is an integer greater than 1.

In a ninth aspect, this invention provides a process for producing the second order nonlinear optic polyimide polymer of formula (II) as described above, comprising the step of:

reacting 4,4'-(hexafluoroisopropylidene)diphthalic anhydride with a compound of formula

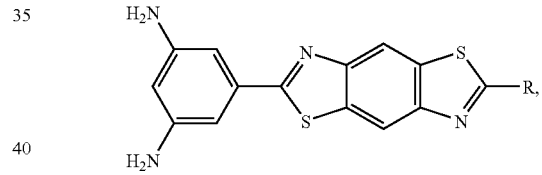

wherein R is the same as that defined for formula (I), so as to form a polyamic acid comprising repeating units represented by the formula (II'), which is processable to form the second order nonlinear optic polyimide polymer of formula (II):

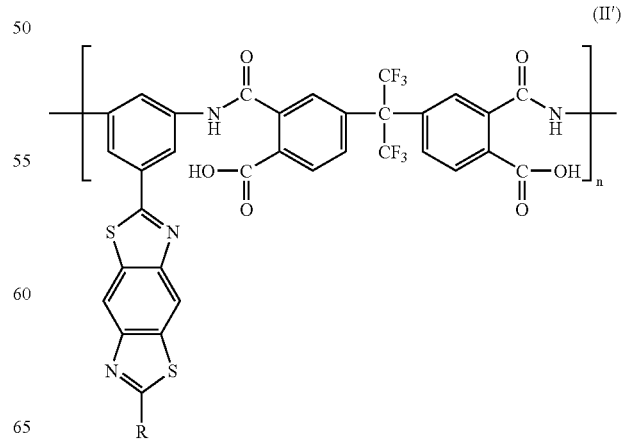

wherein R and n are the same as those defined for formula (II).

According to this invention, the polyamic acid of formula (II') can subsequently be cured to form the desired second order nonlinear optic polyimide polymer of formula (II) as described above.

BRIEF DESCRIPTION OF THE DRAWINGS

The above and other features and advantages of the present invention will become apparent in the following detailed description of the preferred embodiments with reference to the accompanying drawing, of which.

DETAILED DESCRIPTION OF THE INVENTION

Figure 1:
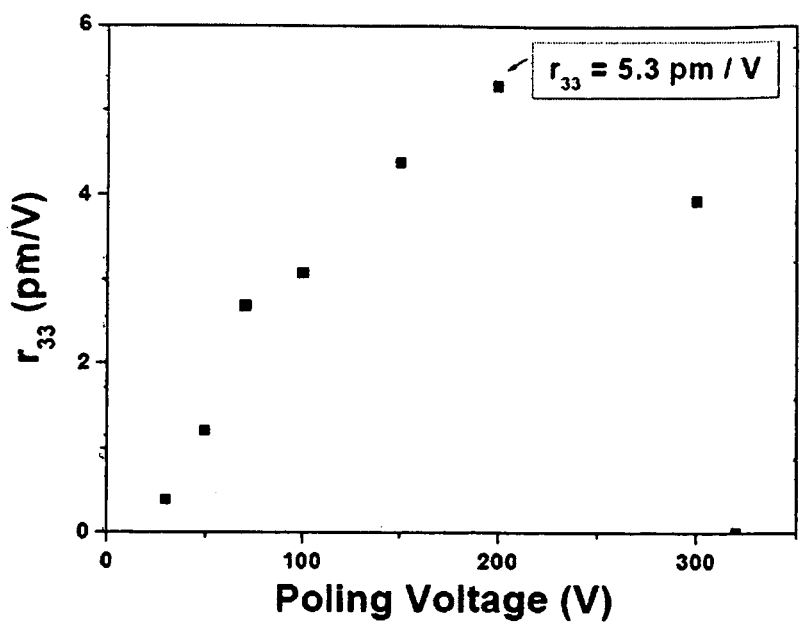
FIG. 1 plots the variation of the electrooptic coefficient, $r_{33}$, of a spin-coated thin film made of polyimide polymer PI-1 in response to increasing poling voltage.

For the purpose of this specification, it will be clearly understood that the word "comprising" means "including but not limited to," and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which this invention belongs.

In this invention, in order to obtain better thermostability and NLO property, the rigidity and resonance of benzo-bisthiazole-based chromophores were utilized to explore the application thereof in the manufacture of second-order nonlinear optics. Novel compounds capable of forming a pendant chromophore moiety were synthesized and subsequently grafted onto soluble host polyimide polymers containing different molar ratios of functionality groups of either —OH or —COOH. The resultant intermediate polyimide polymers were then cured by heating, thus obtaining the desired second order nonlinear optic polyimide polymers having benzo-bisthiazole-based pendant groups, as evidenced by FTIR and UV-Vis spectra. In addition, the obtained second order nonlinear optic polyimide polymers were found to exhibit excellent thermal properties as examined by thermogravimetric analysis (TGA) and thermomechanical analysis (TMA), while having an electro-optic coefficient higher than that generally required for electro-optics to date, i.e., $r_{33}>3$ pm/V.

Therefore, this invention provides a compound of formula (C1):

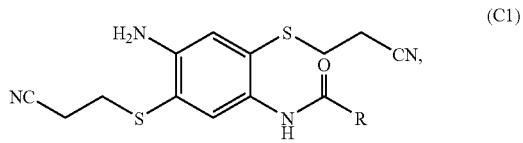

(C1)

wherein R is a phenyl or styryl group that is 3-substituted with a group selected from —NO₂, —COCH₃, —CN, —SO₂NH₂, Br and Cl.

In a preferred embodiment of this invention, R is a p-nitrophenyl group. In another preferred embodiment of this invention, R is a p-nitrostyryl group.

This invention also provides a compound of formula (C2):

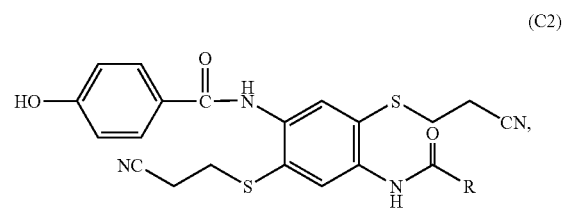

(C2)

wherein R is a phenyl or styryl group that is 3-substituted with a group selected from —NO₂, —COCH₃, —CN, —SO₂NH₂, Br and Cl.

In a preferred embodiment of this invention, R is a p-nitrophenyl group. In another preferred embodiment of this invention, R is a p-nitrostyryl group.

Compounds of formula (C1) and compounds of formula (C2) can be synthesized according to the following Synthesis Scheme (I):

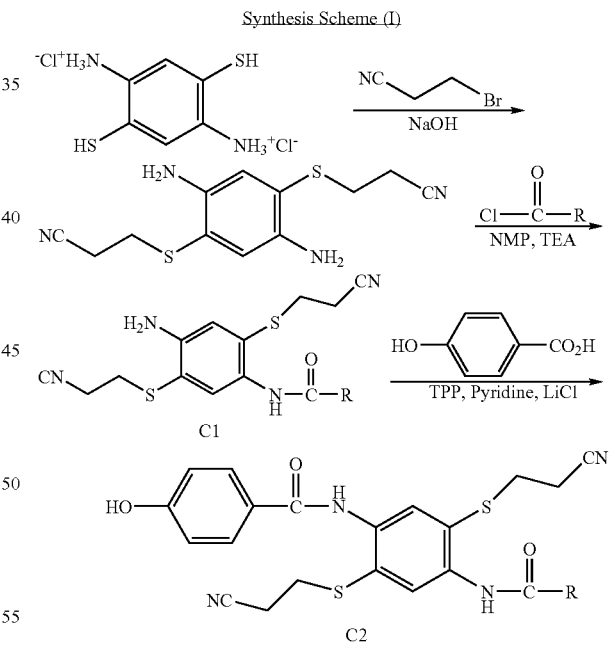

Synthesis Scheme (I)

in which the starting compounds 2,5-diamino-1,4-benzene-dithiol dihydrochloride (DABDT)(J. F. Wolfe et al. (1981), *Macromolecules*, 14: 915-920) and 2,5-bis[(cyanoethyl)thio]-1,4-phenylenediamine (T. Hattori et al. (1993), *Macromolecules*, 26, 4089-4093) can be prepared according to the reported methods.

This invention further provides a compound of formula (C3):

(C3)

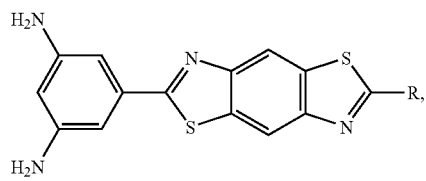

wherein R is a phenyl or styryl group that is 3-substituted with a group selected from —NO$_2$, —COCH$_3$, —CN, —SO$_2$NH$_2$, Br and Cl.

In a preferred embodiment of this invention, R is a p-nitrophenyl group. In another preferred embodiment of this invention, R is a p-nitrostyryl group.

The compound of formula (C3) may be prepared from the compound of formula (C1) according to the following Synthesis Scheme (II):

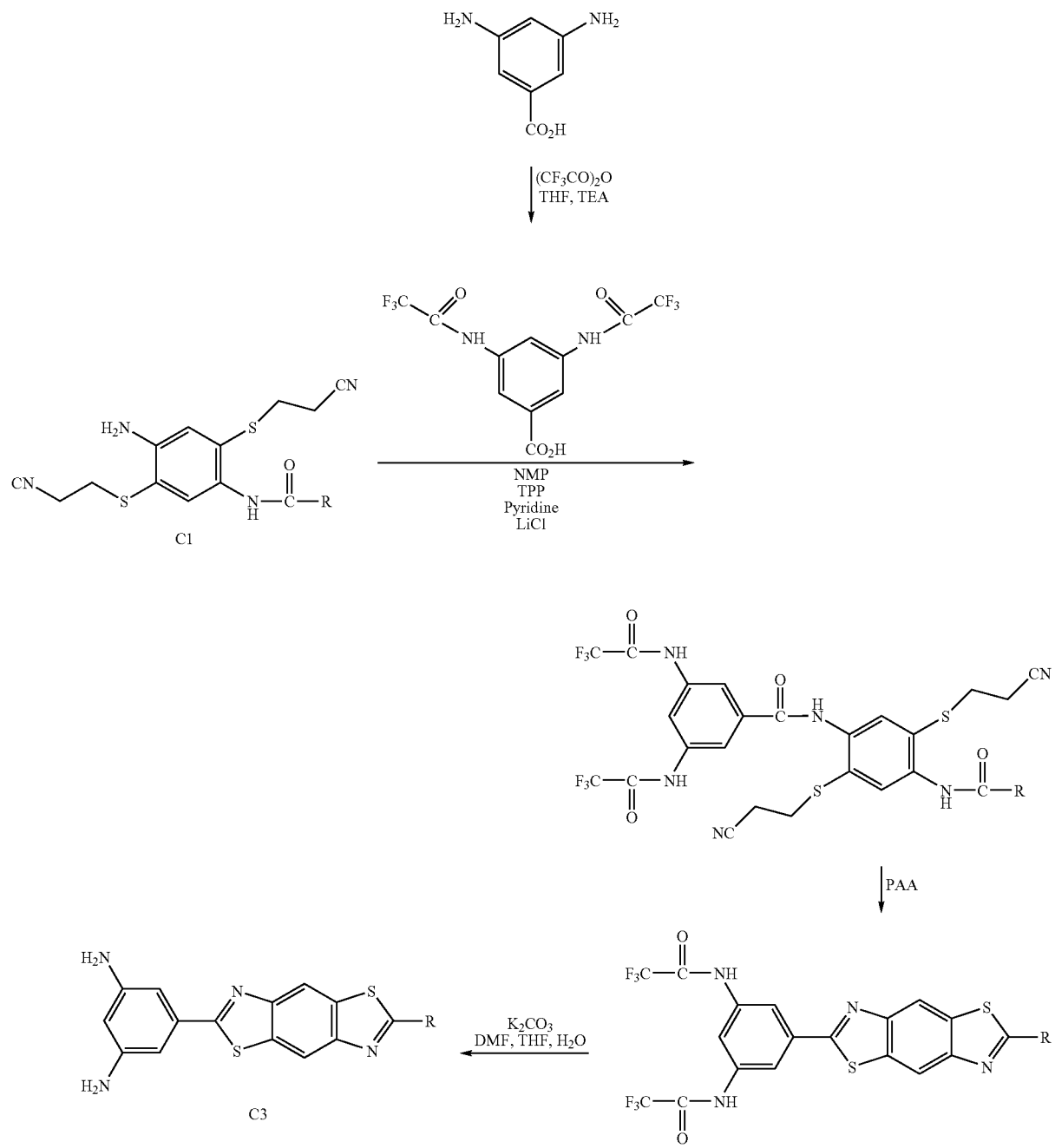

The above-described compounds of formulas (C1), (C2) and (C3) were utilized to form benzobisthiazole-based pendant groups of the second order nonlinear optic polyimide polymers that could exhibit excellent thermostability and NLO property. Therefore, this invention provides a second order nonlinear optic polyimide polymer comprising repeating units represented by the formula:

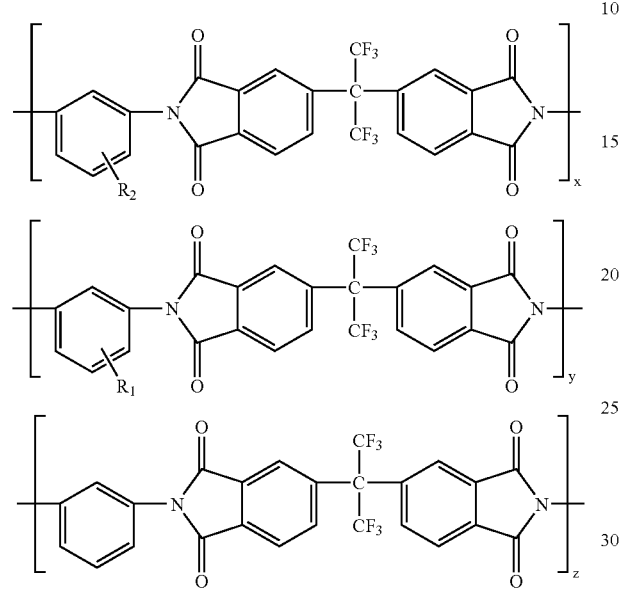

wherein:
R$_1$ is a functionality group selected from —OH and —COOH;
when R$_1$ is —OH, R$_2$ is a group represented by the formula:

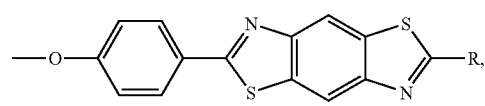

when R$_1$ is —COOH, R$_2$ is a group represented by the formula:

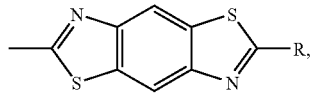

wherein R is a phenyl or styryl group that is 3-substituted with a group selected from —NO$_2$, —COCH$_3$, —CN, —SO$_2$NH$_2$, Br and Cl; and x+y+z=100% of the repeating units, x is at least 1%, and either or both of y and z can be zero.

In a preferred embodiment of this invention, z is zero. In another preferred embodiment of this invention, z=30%. In a further embodiment of this invention, z=60%.

In a preferred embodiment of this invention, R is a p-nitrophenyl group. In another preferred embodiment of this invention, R is a p-nitrostyryl group.

In a more preferred embodiment of this invention, z is zero, and R is a p-nitrophenyl group. In another preferred embodiment of this invention, z is zero, and R is a p-nitrostyryl group.

According to this invention, there is provided a second order nonlinear optic polyimide polymer comprising repeating units represented by the formula:

(IA)

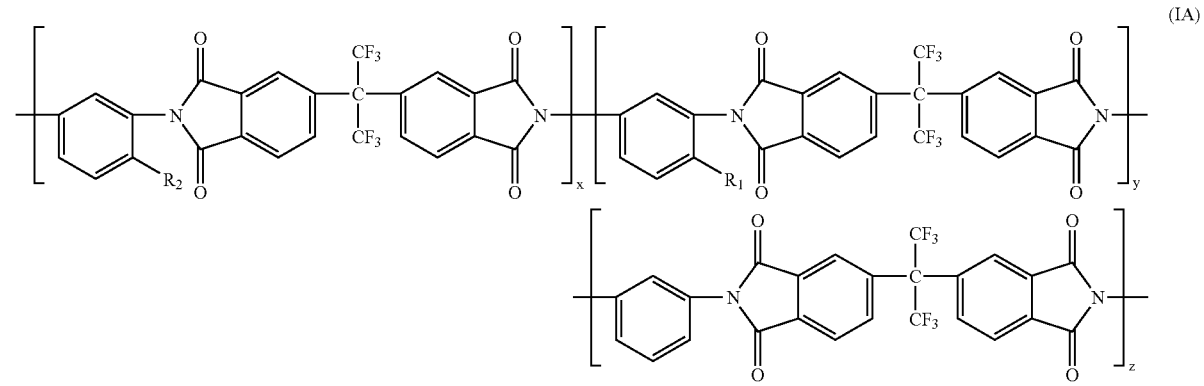

wherein
R$_2$, x, y and z are the same as those defined for formula (I); and

R$_1$ is —OH.

In a more preferred embodiment of this invention, z is zero, and R is a p-nitrophenyl group. In another preferred embodiment of this invention, z is zero, and R is a p-nitrostyryl group.

According to this invention, there is provided a second order nonlinear optic polyimide polymer comprising repeating units represented by the formula:

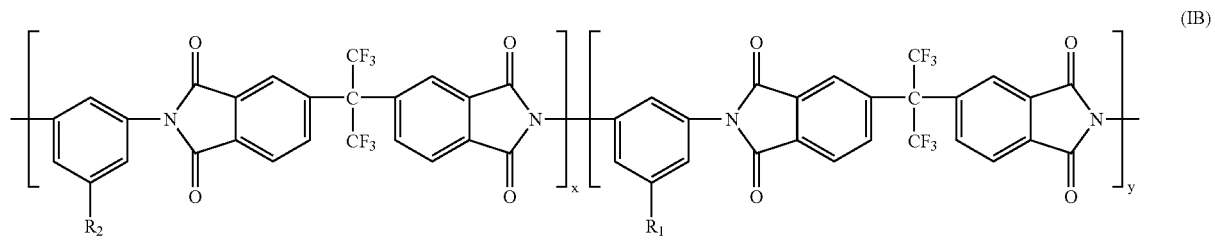

wherein
R$_2$, x, y and z are the same as those defined for formula (I); and
R$_1$ is —COOH.

In a preferred embodiment of this invention, z is zero. In another preferred embodiment of this invention, z=30%. In a further embodiment of this invention, z=60%.

In a preferred embodiment of this invention, R is a p-nitrophenyl group. In another preferred embodiment of this invention, R is a p-nitrostyryl group.

In a more preferred embodiment of this invention, both y and z are zero, and R is a p-nitrophenyl group. In another preferred embodiment of this invention, both y and z are zero, and R is a p-nitrostyryl group.

In yet another preferred embodiment of this invention, z=30%, and R is a p-nitrophenyl group. In another preferred embodiment of this invention, z=60%, and R is a p-nitrophenyl group.

The above-described second order nonlinear optic polyimide polymers of formula (I), which exhibit excellent thermostability and second order NLO property, may be prepared by a process comprising the steps of:

reacting 4,4'-(hexafluoroisopropylidene)diphthalic anhydride with a compound of formula

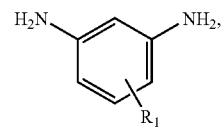

wherein R$_1$ is the same as that defined for formula (I), optionally in the presence of m-phenylenediamine, so as to form a host polyimide polymer comprising repeating units represented by the formula:

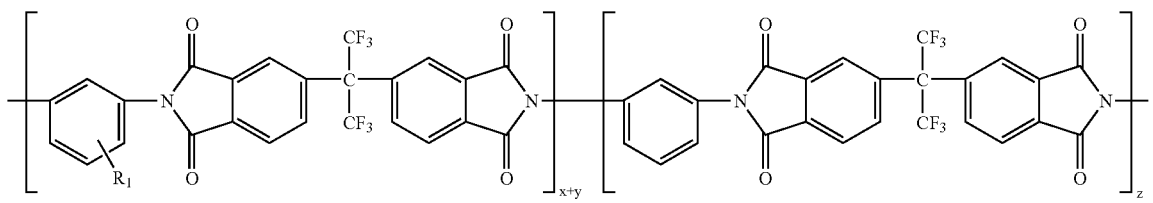

wherein R$_1$, x, y and z are the same as those defined for formula (I); and grafting the thus-formed host polyimide polymer with a compound of formula R$_2$"—H so as to form an intermediate polyimide polymer comprising repeating units represented by the formula (I'), which is processible to form the second order nonlinear optic polyimide polymer of formula (I):

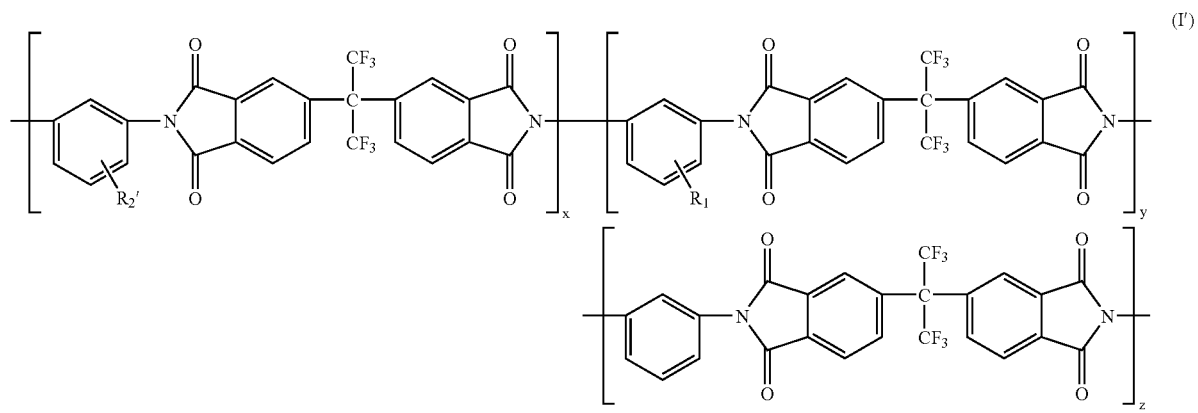

wherein:
R$_1$, x, y and z are the same as those defined for formula (I);
when R$_1$ is —OH, R$_2$" and R$_2$' are the same and represent a group of formula

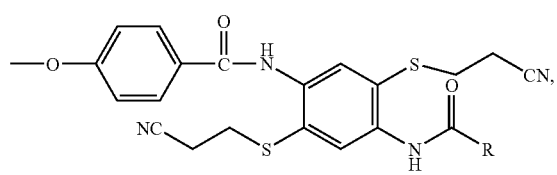

when R$_1$ is —COOH, R$_2$" represents a group of formula

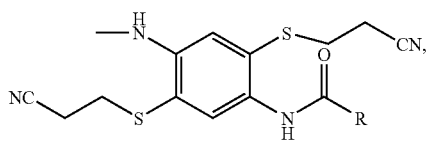

and R$_2$' represents a group of formula

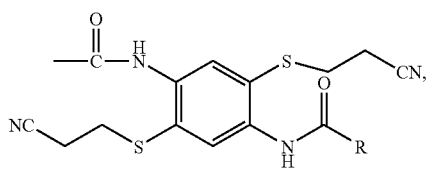

wherein R is a phenyl or styryl group that is 3-substituted with a group selected from —NO$_2$, —COCH$_3$, —CN, —SO$_2$NH$_2$, Br and Cl.

According to this invention, the host polyimide polymer, which was designed to have CF$_3$ groups in the backbone chain thereof, was formed from the reaction of a diamine compound and a dicarboxylic anhydride compound having CF$_3$ groups, so as to increase the solubility of the desired second order NLO polyimide polymers in organic solvents, as well as the optical transparency thereof.

The chromophore moiety-forming compounds according to this invention, when being directly grafted onto the host polyimide polymers, may result in the formation of benzobisthiazole-based pendant groups of a highly conjugated rigid-rod structure that exhibits a low orientation efficiency during poling and, in turn, might undesirably decrease the second order NLO property of the resultant polyimide polymers grafted with the same.

Therefore, in this invention, an attempt was made in order to provide a soft segment bridging the backbone chain of the host polyimide polymer and the grafted benzobisthiazole-based pendant group. To achieve this, a diamine compound containing a hydroxyl group was used to form the host polyimide polymer so that upon grafting, the used chromophore moiety-forming compound was attached to the backbone chain of the host polyimide polymer via an ether bonding, the oxygen atom of which could act as an electron donor during poling. With such a design, the resultant second order NLO polyimide polymer could exhibit satisfactory NLO properties without sacrificing the thermostability thereof.

In a preferred embodiment of this invention, the compound of formula

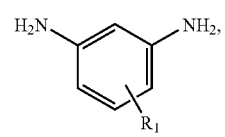

used in the reacting step is selected from the group consisting of 3,5-diaminobenzoic acid, 2,4-diaminobenzoic acid, 2,4-diaminophenol, 2,4-diaminophenol dihydrochloride, and 3,5-diaminophenol.

In a preferred embodiment of this invention, the reacting step is conducted in the absence of m-phenylenediamine so that in the thus-formed intermediate polyimide polymer of formula (I'), z=0. In another preferred embodiment of this invention, the reacting step is conducted in the presence of m-phenylenediamine so that in the thus-formed intermediate polyimide polymer of formula (I'), z=30%. In a further preferred embodiment of this invention, the reacting step is conducted in the presence of m-phenylenediamine so that in the thus-formed intermediate polyimide polymer of formula (I'), z=60%.

In a preferred embodiment of this invention, the reacting step is conducted in the presence of an organic solvent selected from N-methylpyrrolidone (NMP), N,N-dimethylacetamide (DMAc), dimethylformamide (DMF), m-cresol, toluene, pyridine, and combinations thereof. In a more preferred embodiment of this invention, the reacting step is conducted in the presence of NMP.

In a preferred embodiment of this invention, the host polyimide polymer obtained from the reacting step is purified prior to conducting the grafting step. Techniques for purifying polyimide polymers well known to those skilled in the art may be used for this porpose. For example, a simple way of purifying the host polyimide polymer is by pouring the resultant product from the reaction step into deionized water so as to precipitate the host polyimide polymer, followed by filtration and drying.

According to this invention, the grafting step is conducted in the presence of an organic solvent selected from N-methylpyrrolidone (NMP), N,N-dimethylacetamide (DMAc), dimethylformamide (DMF), m-cresol, toluene, pyridine, and combinations thereof. In a preferred embodiment of this invention, the grafting step is conducted in the presence of NMP.

According to this invention, the grafting step may be conducted in the presence of a-catalyst, preferably with the aid of a co-catalyst. In a preferred embodiment of this invention, the grafting step was catalyzed by triphenylphosphite (TPP) in the presence of calcium chloride. In another preferred embodiment of this invention, the grafting step was catalyzed by triphenylphosphine in the presence of diethyl azodicarboxylate (DEAD).

In a preferred embodiment of this invention, the compound of formula $R_2''$—H used in the grafting step is selected from the group consisting of:

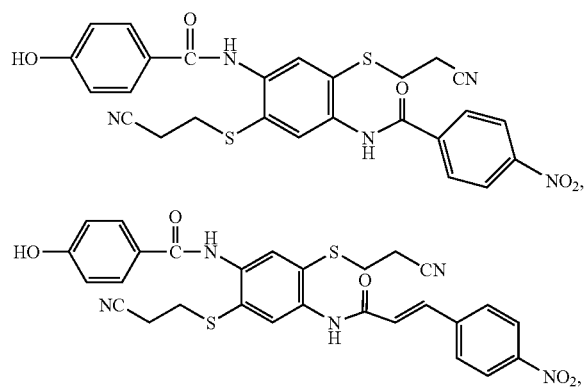

-continued

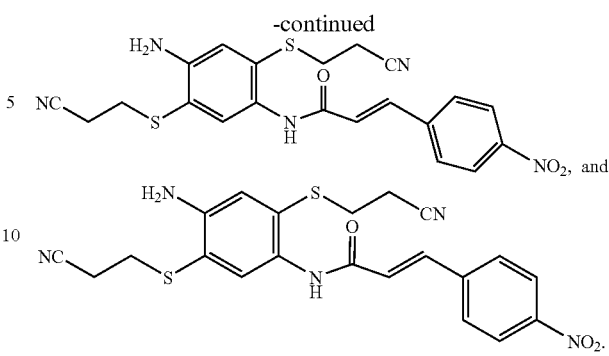

According to this invention, the thus-formed intermediate polyimide polymer of formula (I') may be subjected to a purification treatment.

In a preferred embodiment of this invention, the intermediate polyimide polymer of formula (I') obtained from the grafting step is purified before subjecting to any subsequent processing treatment. Techniques for purifying polyimide polymers well known to those skilled in the art may be used for this purpose. For example, a simple way of purifying the intermediate polyimide polymer of formula (I') is by pouring the resultant product from the grafting step into deionized water so as to precipitate the intermediate polyimide polymer of formula (I'), followed by filtration and drying.

According to this invention, the thus-formed intermediate polyimide polymer of formula (I') is then cured to form the desired second order NLO polyimide polymer of formula (I). In a preferred embodiment of this invention, the intermediate polyimide polymer of formula (I') is cured by: dissolving the intermediate polyimide polymer of formula (I') in an organic solvent to form a mixture; coating the thus-formed mixture on a substrate; and heating the thus-coated substrate to result in a ring-closing reaction on the $R_2'$ group of the intermediate polyimide polymer of formula (I'), so that the second order nonlinear optic polyimide polymer of formula (I) in a form of a thin film is produced.

Suitable organic solvents for dissolving the intermediate polyimide polymer of formula (I') according to this invention include, but are not limited to: N-methylpyrrolidone (NMP), N,N-dimethylacetamide (DMAc), dimethylformamide (DMF), m-cresol, toluene, pyridine, and combinations thereof. In a preferred embodiment of this invention, NMP is used to dissolve the intermediate polyimide polymer of formula (I') in the curing step.

The preparation of the second order nonlinear optic polyimide polymer of formula (I) may be summarized in the following Synthesis Scheme (III):

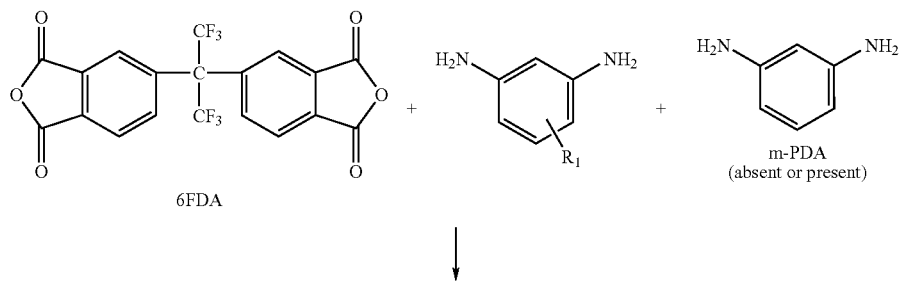

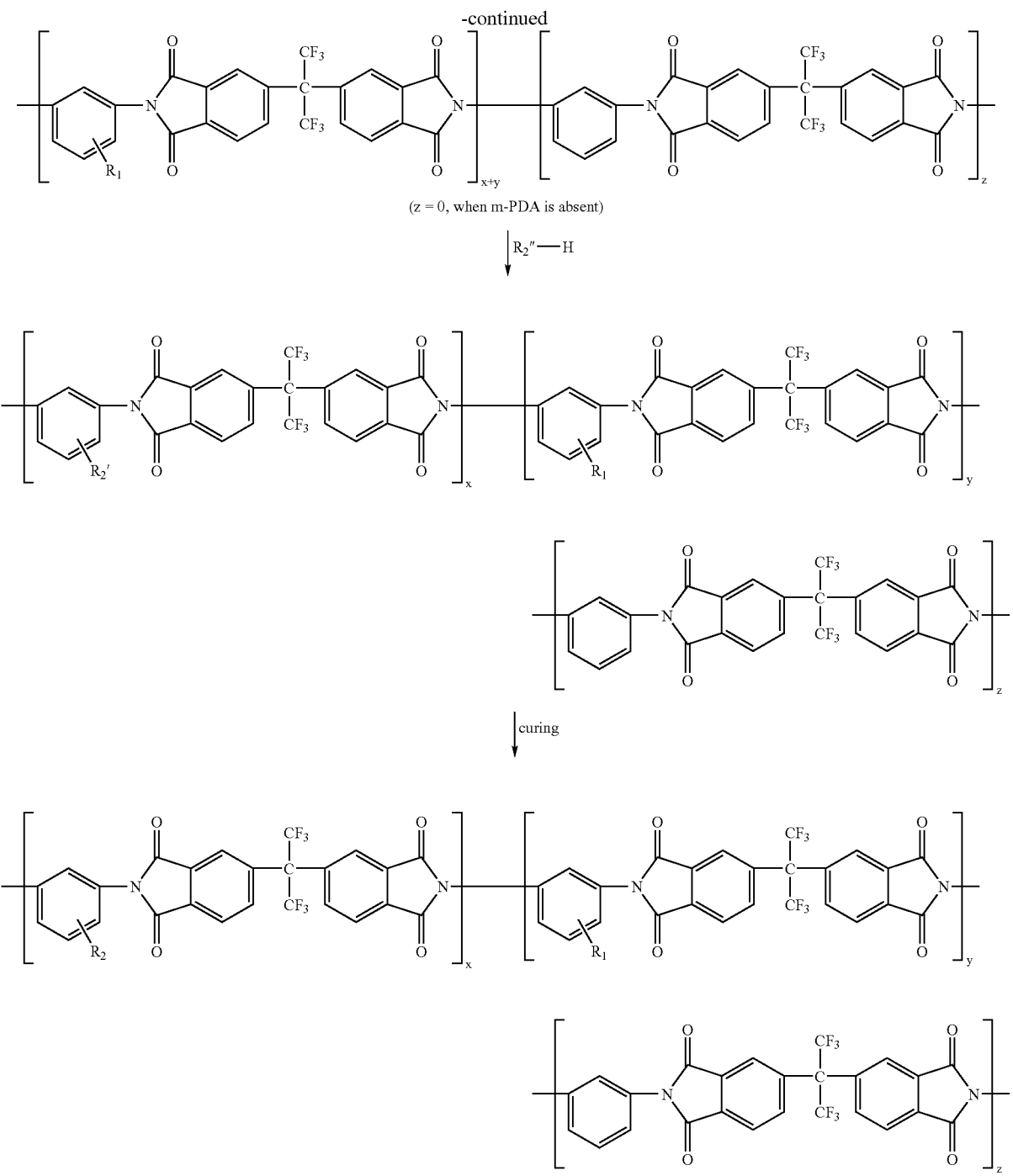

(z = 0, when m-PDA is absent)

According to this invention, the heating sub-step may be conducted in vacuo, preferably at a temperature ranging from 250° C. to 350° C. A vacuum pumping treatment at this stage may help in the removal of the organic solvent as well as any non-reacted small molecule(s) that may be left within the product obtained from the grafting step. In addition, the vacuum pumping treatment may be carried out by conventional approaches known to those skilled in the art, e.g., using a vacuum oven.

In a preferred embodiment of this invention, the intermediate polyimide polymer of formula (I') is admixed with NMP, and the resultant mixture is applied onto an indium-tin oxide (ITO) glass plate by spin coating, followed by heating at 300° C. in vacuo, this resulting in the formation of a cured thin film composed of the second order NLO polyimide polymer of formula (I) on the ITO glass plate. Measurement of the electrooptic coefficient ($r_{33}$) of the cured thin film can then be conducted by in-situ poling according to the reported methods (Y. Shuto et al. (1995), *J Appl Phys*, 77 (9): 4632-4638; H. J. Cha et al. (1996), *Appl Phys Lett*, 68: 1930-1932).

This invention also provides a second order nonlinear optic polyimide polymer comprising repeating units represented by the formula (II):

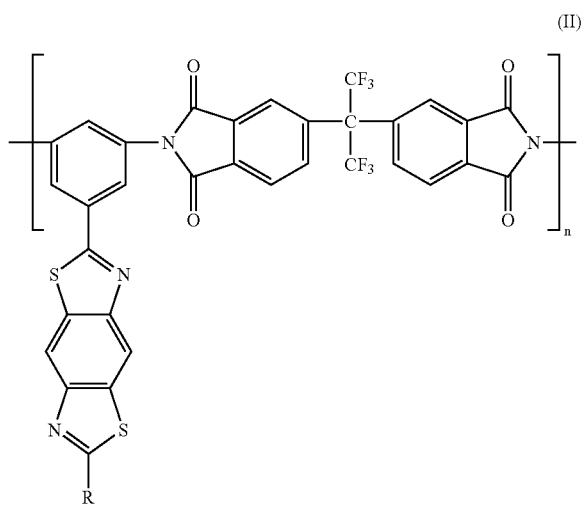

(II)

wherein:
R is a phenyl or styryl group that is 3-substituted with a group selected from —$NO_2$, —$COCH_3$, —CN, —$SO_2NH_2$, Br and Cl; and
n is an integer greater than 1.

The second order nonlinear optic polyimide polymer-of formula (II) can be prepared from a process comprising the step of:

reacting 4,4'-(hexafluoroisopropylidene)diphthalic anhydride with a compound of formula (C3), so as to form a polyamic acid comprising repeating units represented by the formula (II'), which is processible to form the second order nonlinear optic polyimide polymer of formula (II):

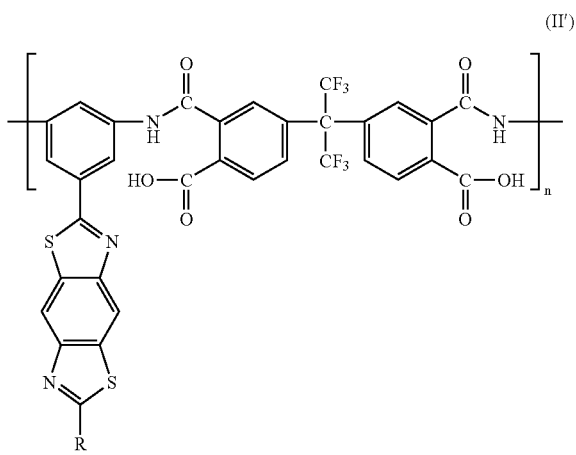

(II')

wherein R and n are the same as those defined for formula (II).

In a preferred embodiment of this invention, the second order nonlinear optic polyimide polymer of formula (II) is prepared using a compound of formula (C3) in which R is a p-nitrophenyl group. In another preferred embodiment of this invention, the second order nonlinear optic polyimide polymer of formula (II) is prepared using a compound of formula (C3) in which R is a p-nitrostyryl group.

According to this invention, the reacting step is conducted in the presence of an organic solvent selected from N-methylpyrrolidone (NMP), N,N-dimethylacetamide (NDAc), dimethylformamide (DMF), m-cresol, toluene, pyridine, and combinations thereof. In a preferred embodiment of this invention, the reacting step is conducted in the presence of NMP.

According to this invention, the thus-formed polyamic acid of formula (II') can be cured in the presence of an organic solvent, such as the one used in the reacting step. In a preferred embodiment of this invention, the polyamic acid of formula (II') is cured by: coating a substrate with the polyamic acid of formula (II') in the presence of said organic solvent; and heating the thus-coated substrate to result in a ring-closing reaction on the polyamic acid of formula (II'), so that the second order nonlinear optic polyimide polymer of formula (II) in a form of a thin film is produced.

According to this invention, heating the thus-coated substrate may be conducted in vacuo, preferably at a temperature ranging from 250° C. to 350° C. A vacuum pumping treatment at this stage may help in the removal of the organic solvent as well as any non-reacted small molecule(s) that may be left within the product obtained from the grafting step. In addition, the vacuum pumping treatment may be carried out by conventional approaches known to those skilled in the art, e.g., using a vacuum oven.

In a preferred embodiment of this invention, the polyamic acid of formula (II') is admixed with NMP, and the resultant mixture is applied onto an ITO glass plate by spin coating, followed by heating at 300° C. in vacuo, resulting in the formation of a cured thin film composed of the second order NLO polyimide polymer of formula (II) on the ITO glass plate.

The preparation of the second order nonlinear optic polyimide polymer of formula (II) may be summarized in the following Synthesis Scheme (IV):

Synthesis Scheme (IV)

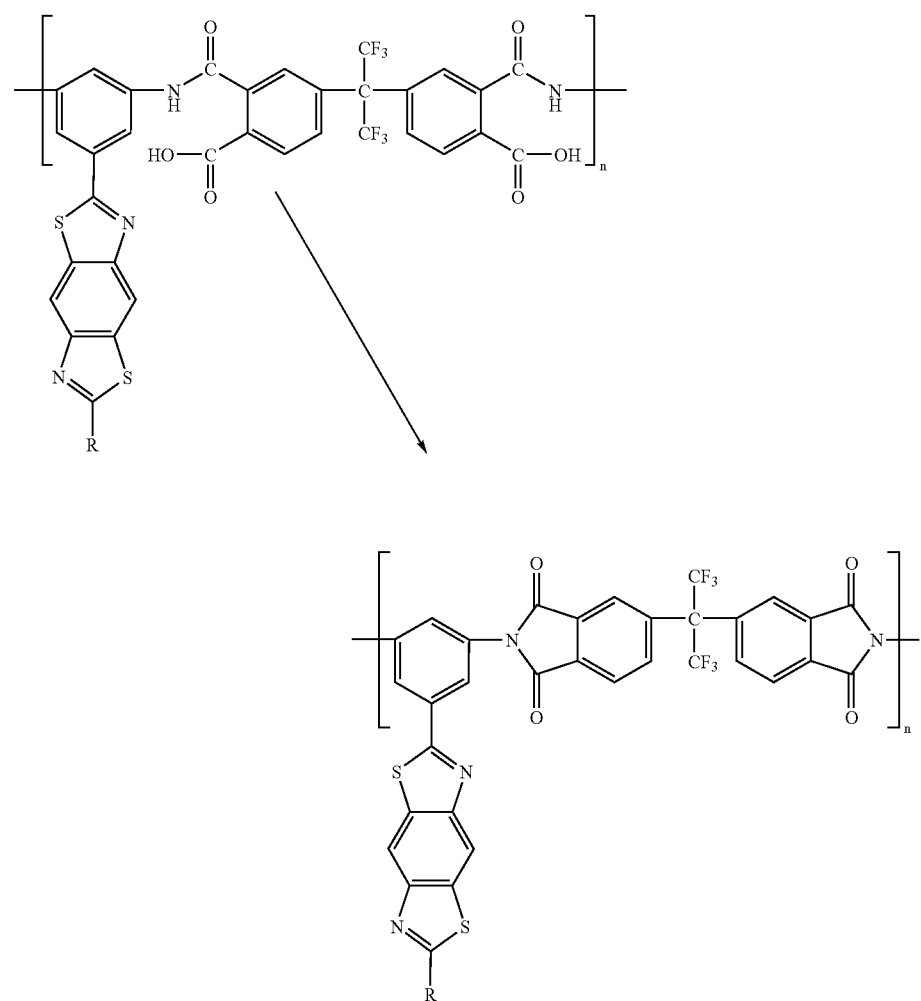

Based on the collected experimental data, the second order NLO polyimide polymers according to this invention were found to exhibit excellent thermal properties and satisfactory NLO property, solubility and viscosity, so that the potential use thereof in the manufacture of electro-optic (EO) devices, such as electro-optic waveguide devices, is promising.

This invention will be further described by way of the following examples. However, it should be understood that the following examples are solely intended for the purpose of illustration and should not be construed as limiting the invention in practice.

EXAMPLES

Materials:
4,4'-(Hexafluoroisopropylidene)diphthalic anhydride (6FDA, Chriskev or Aldrich) was re-crystallized from acetic anhydride (Merck). 3,5-Diaminobenzoic acid (DABA, Merck) was re-crystallized twice from water. Triethylamine (TEA, Acros), m-phenylenediamine (m-PDA, Acros or Aldrich), and triphenylphosphite (TPP, Acros) were distilled before use. N-Methylpyrrolidone (NMP, Tedia or Merck) and pyridine (Tedia) were stirred with powdered calcium hydride overnight, distilled under reduced pressure, and then stored with 4 Å molecular sieves. Lithium chloride (LiCl, Acros) and calcium chloride ($CaCl_2$, Showa) were dried at 200° C. under vacuum before use. 3-Bromopropionitrile (Aldrich), cetyltrimethyl ammonium chloride (TCI), 4-nitrobenzoyl chloride (Aldrich or Acros), trifluoroacetic anhydride (TFAA, Merck), dimethyl sulfoxide (DMSO, Merck), tetrahydrofuran (THF), methanol (Tedia), chloroform (Merck), methanesulfonic acid (MSA, Acros), potassium carbonate ($K_2CO_3$, Showa) and poly(phosphoric acid) (PPA, containing 84% $P_2O_5$, Acros) were used as received.

2,4-Diaminophenol dihydrochloride (DAPD), trans-4-nitrocinnamoyl chloride and 4-hydroxybenzoic acid were purchased from Aldrich. Triphenylphosphine ($PPh_3$) was purchased from Lancaster.

2,5-Diamino-1,4-benzenedithiol dihydrochloride (DABDT)(J. F. Wolfe et al. (1981), *Macromolecules*, 14: 915-920) and 2,5-bis[(cyanoethyl)thio]-1,4-phenylenediamine (T. Hattori et al. (1993), *Macromolecules*, 26: 4089-4093) were prepared according to the reported methods.

Measurements:

Fourier transform infrared (FT-IR) spectra were obtained using a Perkin-Elmer FTIR 2000 spectrometer.

$^1H$ and $^{13}C$ NMR spectra were recorded on a Varian 200 or 400 MHz spectrometer.

UV-Vis spectra were recorded on a LabGuide fluorescence spectrophotometer or a Hitachi 3500 spectrophotometer.

The solubility was determined with 5 mg of polymer in 0.5 g of a solvent under test.

Inherent viscosities of polyimides were determined at a concentration of 0.5 g/dL in NMP by using a Ubbelohde viscometer at 30° C.

The glass transition temperatures (Tg) of polyimide polymers were measured by thermomechanical analysis (TMA) using a TA instruments TMA 2940 thermal analysis system together with a macro expansion probe and a tension probe at a heating rate of 10° C./min under a constant tension of 0.05 N in flowing nitrogen (20 $cm^3$/min), the specimen length between two holders being about 7 mm.

The thermal decomposition temperatures ($T_{d1}$ and $T_{d2}$) of polyimide polymers were measured by thermogravimetric analysis (TGA) performed with a Perkin-Elmer TGA-7 series thermal analysis system at a heating rate of 20° C./min in flowing nitrogen (20 $cm^3$/min).

X-ray diffraction (XRD), crystalline phase and growth directions were determined by XRD (Siemens D5000, Germany) with Cu Kα radiation operated at 40 kV and 30 mA. The 2θ scan range was set to be 1-30° using a step scan of 0.05°/sec.

The spin-coated thin films of polyimide polymers on ITO glass plates were scanned for refractive indices (n) and thickness by a n&k 1280 analyzer (n&k Technology) at wavelengths ranging from 190 to 1000 nm. The n values were calculated by a series of fitting methods with the Forouhi-Bloomer dispersion equations (Forouhi, A. R.; Bloomer, I. In Handbook of optical constants of solid II; Academic Press, 1991, pp. 151-175).

In some experiments, the refractive indices (n) of spin-coated thin films on ITO glass plates were measured according to the method reported in R. Swanepoel (1985), *J. Opt Soc. Am. A*, 2:1339-1343. Basically, the UV transmission spectra of the spin-coated thin films were measured firstly at an incident angle of 900 and secondly at an incident angle of 30°. Peaks and valleys were selected from the thus-obtained UV transmission spectra to calculate the refractive indices corresponding thereto based on the following equation:

$$\frac{n_i}{n_{air}} \cong ni = \frac{\sin i}{\sin r} = \frac{\sin 30°}{\sin r} \text{(when the incident angle = 30°)}$$

in which r is the refractive angle.

Measurement of electrooptic coefficient ($r_{33}$) was conducted using an ellipsometric method with in-situ poling according to Yoshito Shuto et al. (1995), *J. Appl. Phys.*, 77 (9): 4632-4638. An incident laser beam at λ=830 nm (Nd: YAG laser with a pusle<10 ns, and a 10-Hz repetition rate as a fundamental source) was directed toward the back of an ITO glass substrate at an angle θ (=60°). It propagated through the substrate, the ITO electrode, and the polymer film, and was then reflected back out into the air by the bottom of the gold electrode. Polarization of the incident beam was set at 45° to the plane of incidence so that the parallel (p-wave) and perpendicular (s-wave) components of the optical field were equal in amplitude. The reflected beam propagated through a Babinet-Soleil (BS) compensator, a half-wave plate, and an analyzer (polarized beam splitter). Intensities of the beams transmitted and rejected were recorded and processed by a differential amplifier and a lock-in amplifier.

The electrooptic coefficient ($r_{33}$) of a tested polyimide polymer was calculated based on the following equation:

$$r_{33} = \left(\frac{3\lambda}{4\pi n^2}\right)\left(\frac{I_m}{I_c V_m}\right)\frac{(n^2 - \sin^2\theta)^{1/2}}{\sin^2\theta}$$

wherein λ is the wavelength of laser beam; n is the refractive index of the polymer film; $I_c$ is the half-intensity; $I_m$ is the modulated beam intensity; and θ is the incident angle.

Prep. Ex. 1

Synthesis of 2,5-bis[(2-cyanoethyl)sulfanyl]-N-(4-nitrobenzoyl)-1,4-phenylenediamine

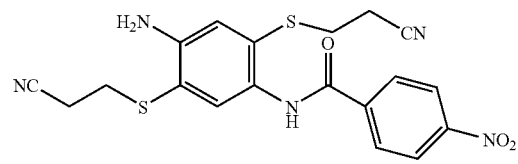

The title compound was synthesized according to Synthesis Scheme I described above.

2,5-Bis[(cyanoethyl)thio]-1,4-phenylenediamine (13.9 g, 50 mmol) was dissolved in 90 mL of NMP in a 250 mL 3-necked round-bottom flask under nitrogen purge. The resultant clear red solution was cooled to 0-5° C. in an ice bath, followed by addition of freshly distilled triethylamine (TEA) by syringe. After stirring for 10 minutes, a mixture of 4-nitrobenzoyl chloride (10.2 g, 55 mmol) and 90 mL of NMP was added into the stirred fed solution drop by drop over a period of 0.5 h. The resultant solution was stirred at 0-5° C.

for 2 h and at room temperature for 1 h, followed by addition of 800 mL of water with stirring. The resultant yellow precipitate was collected by filtration, followed by washing with 800 mL of deionized water twice and 300 mL of methanol once. The obtained product was extracted with methanol using a Soxhlet extractor for 24 h. A yellow solution was collected and evaporated, followed by drying at 60° C. under vacuum overnight, giving the title compound as a red powder (13.1 g, yield 61%).

Detected Properties of the Title Compound:

IR (KBr): 3458, 3351 and 3311 cm$^{-1}$ (NH$_2$ and NH); 2245 cm$^{-1}$ (CN); 1659 cm$^{-1}$ (C=O of amide); 1347 cm$^{-1}$ (NO$_2$).

$^1$H NMR (DMSO-d$_6$, δ, ppm, 200 MHz): 10.07 (s, 1 H); 8.34 (d, J=8.6 Hz, 2H); 8.16 (d, J=8.6 Hz, 2H); 7.26 (s, 1H); 6.87 (s, 1H); 5.54 (s, 2H); 3.11 (dd, J=13.4, 6.8 Hz, 2H); 2.98 (dd, J=13.2, 6.6 Hz, 2H); 2.78 (dd, J=13.6, 7.0 Hz, 2H); 2.69 (dd, J=13.0, 6.6 Hz, 2H).

Anal. calcd. for C$_{19}$H$_{17}$N$_5$O$_3$S$_2$: C, 53.38; H, 4.01; N, 16.38. Found: C, 53.23; H, 4.02; N, 16.13.

Prep. Ex. 2

Synthesis of N-{4-Amino-2,5-bis[(2-cyanoethyl)sulfanyl]-phenyl}-trans-4-nitrocinnamoyl formamide

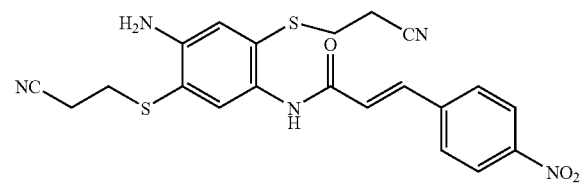

The title compound was synthesized according to Synthesis Scheme I described above.

2,5-Bis[(cyanoethyl)thio]-1,4-phenylenediamine (2.50 g, 9.00 mmol) was admixed with 15 mL of NMP in a 250 mL 3-necked round-bottom flask with nitrogen purge. The resultant mixture was cooled to around 0° C. in an ice bath with stirring, followed by the addition of trans-4-nitrocinnamoyl chloride (2.00 g, 9.45 mmol, dissolved in 13 mL NMP) drop by drop. Thereafter, the ice bath was removed, and 400 mL of water was poured into the flask to result in the formation of a solid precipitate, which was collected by filtration. The thus-obtained solid was added into 400 mL of water and heated to 60° C. for 10 min. After filtration, the collected solid was admixed with 600 mL of methanol, followed by filtration. An orange solid was obtained and dried in a vacuum oven at 80° C., giving the title compound in a yield of 78.13%.

Detected Properties of the Title Compound:

IR (KBr): 3443 and 3342 cm$^{-1}$ (NH$_2$); 2247 cm$^{-1}$ (CN); 1665 cm$^{-1}$ (C=O of amide); 1628 cm$^{-1}$ (C=C of ethylene); 1597,1567 and 1512 cm$^{-1}$ (C=C of benzene); 1342 cm$^{-1}$ (NO$_2$).

$^1$H-NMR (DMSO-d$_6$, δ, ppm, 200 MHz): 9.48 (s, 1H, NHCO); 8.30~8.28 (d, 2H, aromatic proton); 7.95~7.81 (d, 2H, aromatic proton); 7.68~7.58 (d, 1H, CH=CH); 7.41 (s, 1H); 7.18~7.08 (d, 1H, CH=CH); 6.82 (s, 1H, aromatic proton); 5.48 (s, 2H, NH$_2$); 3.13~3.06 (t, 2H, CH$_2$C); 3.01~2.93 (t, 2H, CH$_2$C); 2.80~2.73 (t, 2H, CH$_2$CH$_2$); 2.71~2.64 (t, 2H, CH$_2$CH$_2$).

Anal. calcd. for C$_{21}$H$_{19}$N$_5$O$_3$S$_2$: C, 55.61; H, 4.22; N, 15.44; S, 14.14. Found: C, 55.62; H, 4.25; N, 15.24; S, 13.82.

Prep. Ex. 3

Synthesis of 2,5-bis[(2-cyanoethyl)sulfanyl]-N-(p-hydroxybenzoyl)-N'-(p-nitrobenzoyl)-p-phenylenediamine

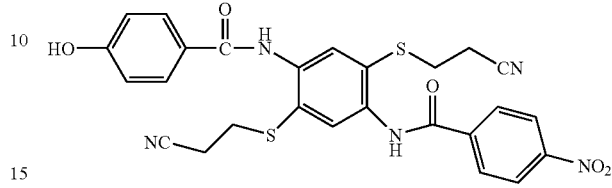

The title compound was synthesized according to Synthesis Scheme I described above.

2,5-Bis[(2-cyanoethyl)sulfanyl]-N-(4-nitrobenzoyl)-1,4-phenylenediamine (1.0 g, 2.34 mmol) as prepared from the above Example 1 was admixed with 4-hydroxybenzoic acid (0.328 g, 2.38 mmol) in 11.7 mL NMP under nitrogen purge, followed by addition of lithium chloride (LiCl, 0.58 g), triphenylphosphite (TPP, 2.92 mL) and pyridine (2.92 mL). The resultant mixture was heated to a temperature of 80~95° C. for about 4 h, followed by cooling to room temperature. 400 mL of water was subsequently added with stirring for a few minutes, and the resultant precipitate was collected by filtration, washed with water (400 mL, twice) and methanol (400 mL, once), followed by drying at room temperature under vacuum overnight, giving the title compound in a yield of 76.3%.

Detected Properties of the Title Compound:

IR (KBr): 3443 cm$^{-1}$ (OH); 2246 cm$^{-1}$ (CN); 1675 cm$^{-1}$ (C=O of amide); 1659 cm$^{-1}$ (amide l); 1562 cm$^{-1}$ (amide 11); 1534 cm$^{-1}$ (NH of amide); 1375 cm$^{-1}$ (NO$_2$).

$^1$H-NMR (DMSO-d$_6$, δ, ppm, 200 MHz): 10.39 (s,1H, NHCO); 10.15 (s,1H, OH); 9.76 (s, 1H, NHCO); 8.39~8.34 (d, 2H, aromatic proton); 8.21~8.17 (d, 2H, aromatic proton); 7.87~7.82 (d, 2H, aromatic proton); 7.70 (s, 1H, aromatic proton); 7.60 (s, 1H, aromatic proton); 6.87~6.83 (d, 2H, aromatic proton); 3.24~3.12 (d, 4H, CH$_2$C); 2.80~2.71 (d, 4H, CH$_2$CH$_2$).

Anal. calcd. for C$_{26}$H$_{21}$N$_5$O$_5$S$_2$: C, 57.03; H, 3.87; N, 12.79; S, 11.71. Found: C, 55.35; H, 4.14; N, 12.10; S,11.02.

Prep. Ex. 4

Synthesis of N-[4-(p-hydroxybenzoyl)]-2,5-bis[(2-cyanoethyl)sulfanyl]phenyl]-trans-4-nitrocinnamoyl formamide

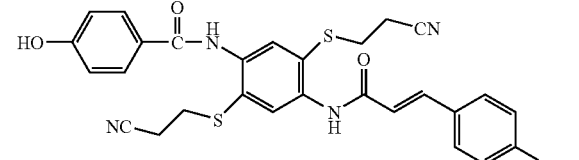

The title compound was synthesized according to Synthesis Scheme I described above.

N-{4-Amino-2,5-bis[(2-cyanoethyl)sulfanyl]-phenyl}-trans4-nitrocinnamoyl formamide (1 g, 2.20 mmol) as prepared from the above Example 2 was admixed with 4-hydroxybenzoic acid (0.31 g, 2.24 mmol) in 11.7 mL NMP under nitrogen purge, followed by addition of lithium chloride (LiCl, 0.58 g), triphenylphosphite (TPP, 2.92 mL) and pyridine (2.92 mL). The resultant mixture was heated to a temperature of 80~100° C. for about 4 h, followed by cooling to room temperature. 400 mL of water was subsequently added with stirring for a few minutes, and the resultant precipitate was collected by filtration, washed with water (400 mL, twice) and methanol (400 mL, once), followed by drying at 70° C. under vacuum overnight, giving the title compound in a yield of 82%.

Detected Properties of the Title Compound:
IR (KBr): 3305 cm$^{-1}$ (NH of amide); 2248 cm$^{-1}$ (CN); 1671 cm$^{-1}$ (C=O of amide); 1601 and 1514 cm$^{-1}$ (C=C of benzene ring); 1342 cm$^{-1}$ (NO$_2$).

$^1$H-NMR (DMSO-d$_6$, δ, ppm, 200 MHz): 11.45 (s, 1H); 9.84 (s, 1H); 9.75 (s, 1H); 8.35~8.21 (d, 2H); 7.96~7.80 (m,4H); 7.78~7.68 (d, 1H); 7.32~7.18 (m, 2H); 6.92~6.80 (d, 2H); 3.25~3.08 (m, 4H); 2.88~2.74 tm, 4H).

Anal. calcd. for C$_{28}$H$_{23}$N$_5$O$_5$S$_2$: C, 41.61; H 4.07; N, 8.09; S, 18.50. Found: C, 41.57; H, 4.05; N, 8.10; S, 18.48.

Prep. Ex. 5

Synthesis of 5-{6-(4-nitrophenyl)benzo[1,2-d;4,5d'] bisthiazol-2-yl}benzene-1,3-diamine

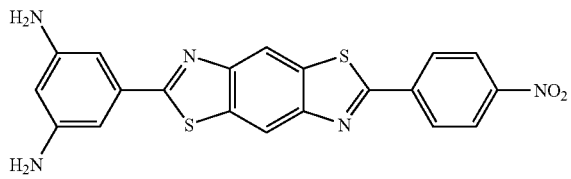

The title compound was synthesized according to Synthesis Scheme II described above.

1. Preparation of 3,5-bis[(2,2,2-trifluoroacetyl)amino]benzoic acid

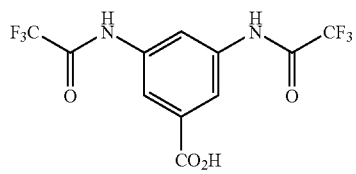

3,5-Diaminobenzoic acid (6.08 g, 40 mmol) and TEA (7.27 g, 72 mmol) were dissolved in 30 mL of THF and 30 mL of DMSO with nitrogen purge. Trifluoroacetic anhydride (50.4. g, 240 mmol) was loaded into the stirred mixture at 0~5° C. over a period of 1 h, and the resultant mixture was continuously stirred at that temperature for 1 h and then at 50° C. for 1 h. The resultant lightly brown solution was poured into 1500 mL of water with stirring, resulting in the formation of a grey precipitate, which was collected by filtration, followed by washing with 500 mL of water. Thereafter, the product was dried at 75° C. overnight under vacuum to give the title compound in a yield of 82%.

Detected Properties of the Title Compound:
IR (KBr): 3532 cm$^{-1}$ (OH); 3284 cm$^{-1}$ (NH); 1720 cm$^{-1}$ (C=O).

$^1$H NMR (DMSO-d$_6$, δ, ppm, 200 MHz): 11.56 (s, 2H); 8.43 (dd, J=3.6, 1.8 Hz, 1H); 8.14 (d, J=2 Hz, 2H).

2. Preparation of N-{4-nitrobenzamide-2,5-bis[(2-cyanoethyl)sulfanyl]phenyl}-3,5-bis[(2,2,2-trifluoroacetyl)amino]benzamide

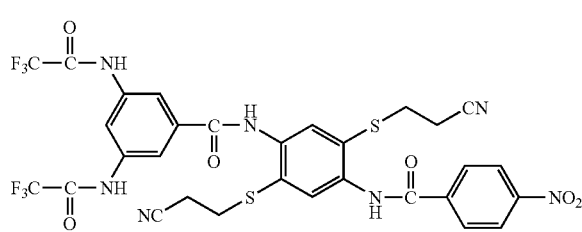

3,5-bis[(2,2,2-trifluoroacetyl)amino]benzoic acid (3.44 g, 10 mmol) as obtained above and 2,5-Bis[(2-cyanoethyl)sulfanyl]-N-(4-nitrobenzoyl)-1,4-phenylenediamine (3.42 g, 8 mmol) as prepared from the above Example 1 were dissolved in 16 mL of NMP at room temperature under nitrogen purge. The mixture was then added with 4 mL of TPP, 4 mL of pyridine and 0.5 g of LiCl. The resultant red solution was stirred at 100° C. for 2 h and then cooled to room temperature. Thereafter, the mixture was poured into 500 mL of water with stirring to give a yellow precipitate, which was collected by filtration, followed by washing with 300 mL of methanol. The washed product was dried at 75° C. overnight under vacuum to give the tile compound in a yield of 85%.

Detected Properties of the Title Compound:
IR (KBr): 3293 cm$^{-1}$ (NH); 2253 cm$^{-1}$ (CN); 1727 cm$^{-1}$ (C=O); 1349 cm$^{-1}$ (NO$_2$).

$^1$H NMR (DMSO-d$_6$, δ, ppm, 200 MHz): 11.61 (s, 2H); 10.43 (s, 1H); 10.21 (s, 1H); 8.40 (s, 1H); 8.35 (d, J=4.2 Hz, 2H); 8.21 (d, J=8.6 Hz, 2H); 8.09 (d, J=6.6 Hz, 2H); 7.63 (d, J=1.4 Hz, 2H); 3.20 (dd, J=13.4, 6.6 Hz, 4H); 2.78 (dd, 13.4, 6.6 Hz, 4H).

ANAL. Calcd. for C$_{30}$H$_{21}$F$_6$N$_7$O$_6$S$_2$: C, 47.81; H, 2.81; N, 13.01. Found: C, 47.54; H, 2.90; N, 12.82.

3. Preparation of 5-{6-4-Nitrophenyl)benzo[1,2-d;4,5d']bisthiazol-2-yl}benzene-1,3-diamine N-{4-nitrobenzamide-2,5-bis[(2-cyanoethyl)sulfanyl]phenyl}-3,5-bis[(2,2,2-trifluoroacetyl)amino]benzamide (1.5 g, 2 mmol) as obtained above was mixed with 13.5 g of PPA by mechanical stirring under argon purge where a glass stirrer was used. The mixture was heated at 100° C. for 12 h and then at 125° C. for 12 h. The resultant viscous dark red solution was cooled to room temperature and precipitated in deionized (DI) water. The resultant precipitate was collected by filtration, washed with 500 mL of methanol three times and further dried at 80° C. overnight under vacuum to give an intermediate compound, which was subsequently dissolved in a mixture solution of 50 mL of DMSO, 100 mL of THF, 50 mL of water, and 1 g of K$_2$CO$_3$ to result in a dark red solution. The thus-obtained solution was stirred at 45~50 ° C. under nitrogen purge for two days, followed by evaporation using a rotavapor to remove THF. The resultant product was then poured into 500 mL of water with stirring and a red brown precipitate was formed. The precipitate was collected by filtration, washed with 200 mL of water once and 300 mL of methanol twice. The resultant dark red brown solid was dried at 80° C. under vacuum for 24 h to give the title compound in a yield of 19%.

Detected Properties of the Title Compound:

IR (KBr): 3345 cm$^{-1}$ (NH$_2$); 1519 and 1342 cm$^{-1}$ (NO$_2$); 1477, 1312, 1010, 851 and 687 cm$^{-1}$ (heteroring).

$^1$H NMR (DMSO-d$_6$, δ, ppm, 400 MHz): 8.83 (d, 2H); 8.40 (d, J=8.8 Hz, 2H); 8.37 (d, J=9.2 Hz, 2H); 6.62 (s, 2H); 6.03 (s, 1H), 5.15 (s, 4H).

$^{13}$C NMR (DMSO-d6, δ, ppm, 400 MHz): 101.89, 102.68, 115.63, 116.51, 124.57, 128.43, 133.50, 134.17, 134.26, 138.19, 148.78, 149.95, 151.13, 152.26, 165.34, 170.96.

HRMS (70 eV, EI$^+$): 419.0505 (simulated) and 419.0506 (found).

Prep. Ex. 6

Synthesis of Host Polyimide Polymers

The host polyimide polymers used in the subsequent examples were prepared according to Synthesis scheme III described above using 4,4'-(hexafluoroisopropylidene)diphthalic anhydride (6FDA) and a diamine compound selected from 3,5-Diaminobenzoic acid (DABA) and 2,4-diaminophenol dihydrochloride (DAPD), in the absence or presence of m-phenylenediamine (m-PDA).

1. Preparation of Host Polyimide Polymer I (in which R$_1$ is —COOH, and z=0):

1.52 g of DABA (10 mmol) was dissolved in 33 mL of NMP under nitrogen purge. The resultant clear solution was cooled to 0~5° C., followed by the addition of 6FDA (4.44 g, 10 mmol). The thus-obtained viscous solution was stirred at 0~5° C. for 2 h and then at room temperature for 24 h, followed by the addition of toluene. The resultant mixture was heated under reflux for 4 h so as to remove water azeotropically by a Dean-Stark trap. Thereafter, the mixture was cooled to room temperature and diluted with 30 mL of NMP. The resultant mixture was poured into 700 mL of water with stirring, so that a fibrous precipitate was formed therefrom. The precipitate was collected by filtration, washed with 700 mL of methanol twice, and then dried at 90° C. under vacuum for 24 h. Yield=99.3%.

Detected Properties of Host Polyimide Polymer I:

IR (KBr): 3600-2500 cm$^{-1}$ (OH of COOH and C—H of benzene ring); 1785 and 1727 cm$^{-1}$ (C=O of imide); 1666 cm$^{-1}$ (C=O of COOH); 1358 cm$^{-1}$(C—N—C of imide); 1256,1211 and 1144 cm$^{-1}$ (C—F); 1112 and 721 cm$^{-1}$ (def. of imide).

2. Preparation of Host Polyimide Polymer II (in which R$_1$ is —COOH, and z=30%):

Host polyimide polymer II was prepared substantially according to the same procedures as set forth above in the preparation of host polyimide polymer I, with the exception that 30 mol% of DABA was replaced by m-PDA, giving the desired product in a yield of 99.5%.

Detected Properties of Host Polyimide Polymer II:

IR (KBr): 3600-2500 cm$^{-1}$ (OH of COOH and C—H of benzene ring); 1785 and 1728 cm$^{-1}$ (C=O of imide); 1626 cm$^{-1}$ (C=O of COOH); 1359 cm$^{-1}$ (C—N—C of imide); 1256, 1211 and 1145 cm$^{-1}$ (C—F); 1107 and 721 cm$^{-1}$ (def. of imide).

3. Preparation of Host Polyimide Polymer III (in which R$_1$ is COOH, and z=60%):

Host polyimide polymer III was prepared substantially according to the same procedures set forth above in the preparation of host polyimide polymer I, with the exception that 60 mol % of DABA was replaced by m-PDA, giving the desired product in a yield of 99.7%.

Detected Properties of Host Polyimide Polymer III:

IR (KBr): 3600-2500 cm$^{-1}$ (OH of COOH and C—H of benzene ring); 1784 and 1728 cm$^{-1}$ (C=O of imide); 1625 cm$^{-1}$ (C=O of COOH); 1361 cm$^{-1}$ (C—N—C of imide); 1256,1210 and 1144 cm$^{-1}$ (C—F); 1108 and 721 cm$^{-1}$ (def. of imide).

4. Preparation of Host Polyimide Polymer IV (in which R$_1$ is —OH, and z=0):

0.44 g of DAPD (2.25 mmol) was dissolved in 7.97 mL of NMP under nitrogen purge, followed by the addition of 0.6 mL of pyridine. The resultant mixture was cooled to 0~5° C., followed by the addition of 6FDA (1.00 g, 2.25 mmol). The resultant mixture was stirred at room temperature for 12 h, giving a solution containing an intermediate polyamic acid. The thus-obtained solution was added with toluene and heated to 160° C. under reflux for 48 h. Thereafter, the solution was poured into DI water to result in the formation of a precipitate, which was collected by filtration. The collected precipitate was re-dissolved in NMP and subjected to methanol precipitation (twice), followed by drying at 80° C. under vacuum. Yield=94.9%.

Detected Properties of Host Polyimide Polymer IV:

IR (KBr): 3448 cm$^{-1}$ (OH); 3118 and 3083 cm$^{-1}$ (C-H of benzene ring); 1622 and 1515 cm$^{-1}$ (C=C of benzene ring); 1788 and 1729 cm$^{-1}$ (C=O of imide); 1368 cm$^{-1}$ (C—N—C of imide); 1256, 1194 and 1144 cm$^{-1}$ (C—F).

5. Preparation of Polyimide Polymer M (in which both x and y are zero):

Polyimide polymer M (in which both x and y are zero) was prepared for comparison with the second NLO polyimide polymers according to this invention. m-Phenylenediamine (1.08 g, 10 mmol) was dissolved in 36 mL of NMP under nitrogen purge. The resultant clear solution was cooled to 0~5° C. and then admixed with 6FDA (4.44 g, 10 mmol) with stirring. The subsequent procedures were the same as those described in the preparation of the host polyimide polymer I. Yield=99.7%.

Detected Properties of Polyimide Polymer M:

IR (KBr): 3600-2500 cm$^{-1}$ (OH of COOH and C—H of benzene ring); 1785 and 1727 cm$^{-1}$ (C=O of imide); 1360 cm$^{-1}$ (C—N—C of imide); 1255, 1208 and 1144 cm$^{-1}$ (C—F); 1108 and 721 cm$^{-1}$ (def. of imide).

Example 1

Synthesis of Second Order NLO Polyimide Polymer PI-1 (in which $R_1$ is COOH, z=0, and R=p-nitrophenyl)

The second order NLO polyimide polymer PI-1 was prepared according to Synthesis scheme III described above, in which the host polyimide polymer I obtained in Preparative Example 6 and 2,5-bis[(2-cyanoethyl)sulfanyl]-N-(4-nitrobenzoyl)-1,4-phenylenediamine obtained in Preparative Example 1 were used.

1. Preparation of Intermediate Polyimide Polymer 1A (in which $R_1$ is —COOH, z=0, and R=p-nitrophenyl)

1.4 g of the host polyimide polymer I was thoroughly dissolved in 70 mL of NMP at 60~70° C. under nitrogen purge. The resultant solution was cooled to room temperature and admixed with 2,5-bis[(2-cyanoethyl)sulfanyl]-N-(4-nitrobenzoyl)-1,4-phenylenediamine (1.07 g, 2.5 mmol) and calcium chloride (0.50g, 4.50 mmol), followed by the addition of 5 mL of TPP and 5 mL pyridine via syringes. The resultant red solution was heated at 85~95° C. for 2 h. After cooling to room temperature, the solution was poured into 800 mL of water with stirring, so that a yellow solid was precipitated. The solid was collected by filtration and washed with 500 mL of methanol twice, followed by drying at 90° C. under vacuum for 30 h. Yield=98%.

Detected Properties of the Intermediate Polyimide Polymer 1A:

IR (KBr): 3345 cm$^{-1}$ (N—H); 2251 cm$^{-1}$ (CN); 1782 and 1728 cm$^{-1}$ (C=O of imide); 1679 cm$^{-1}$ (C=O of amide); 1527 cm$^{-1}$ (N—H bending str. of amide and asym. str. of NO$_2$); 1355 cm$^{-1}$ (C—N—C of imide and sym. str. of NO$_2$); 1101 and 719 cm$^{-1}$ (def. of imide).

2. Preparation of Second Order NLO Polyimide Polymer PI-1 (in which $R_1$ is —COOH, z=0, and R=p-nitrophenyl)

1 g of the intermediate polyimide polymer 1A was dissolved in 9 mL of NMP. The resultant solution was spin-coated onto ITO (resistance 50 ohm) glass plates and petri dishes, respectively, followed by heating at 300° C. under vacuum for 16 hrs, so as to result in a ring-closing reaction on the grafted pendant groups of the intermediate polyimide polymer 1A. Finally, thin films of the polyimide polymer PI-1 were obtained.

Detected Properties of the Second Order NLO Polyimide Polymer PI-1:

IR (KBr): 1785 and 1731 cm$^{-1}$ (C=O of imide); 1525cm$^{-1}$ (asym. str. of NO$_2$); 1353 cm$^{-1}$ (C—N—C of imide and sym. str. of NO$_2$); 1627, 1390, 1298, 1043, 851 and 690 cm$^{-1}$ (heteroring, benzothiazole); 1104 and 721 cm$^{-1}$ (def. of imide).

Example 2

Synthesis of Second Order NLO Polyimide Polymer PI-2 (in which $R_1$ is —COOH, z=30%, and R=p-nitrophenyl)

1. Preparation of Intermediate Polyimide Polymer 2A (in which $R_1$ is —COOH, z=30%, and R=p-nitrophenyl)

The intermediate polyimide polymer 2A was prepared substantially according to the same procedures set forth above in the preparation of the intermediate polyimide polymer 1A, with the exceptions that the host polyimide polymer II obtained in Preparative Example 6 was used and that the used amount of 2,5-bis[(2-cyanoethyl)sulfanyl]-N-(4-nitrobenzoyl)-1,4-phenylenediamine was reduced by 30 mol %. Yield=99.7%.

Detected Properties of the Intermediate Polyimide Polymer 2A:

IR (KBr): 3346 cm$^{-1}$ (NH); 2250 cm$^{-1}$ (CN); 1784 and 1731 cm$^{-1}$ (C=O of imide); 1679 cm$^{-1}$ (C=O of amide); 1528 cm$^{-1}$ (NH, NO$_2$); 1357 cm$^{-1}$ (C—N—C, NO$_2$); 1105 and 721 cm$^{-1}$ (def. of imide).

2. Preparation of Second Order NLO Polyimide Polymer PI-2 (in which $R_1$ is —COOH, z=30%, and R=p-nitrophenyl)

Thin films composed of the second order NLO polyimide polymer PI-2 were formed from a solution containing the intermediate polyimide polymer 2A dissolved in NMP substantially according to the same procedures set forth above in the preparation of the second order NLO polyimide polymer PI-1.

Detected Properties of the Second Order NLO Polyimide Polymer PI-2:

IR (KBr): 1785 and 1729 cm$^{-1}$ (C=O of imide); 1525 cm$^{-1}$ (asym. str. of NO$_2$); 1355 cm$^{-1}$ (C—N—C of imide and sym. str. of NO$_2$); 1630, 1388, 1298, 1043, 849 and 690 cm$^{-1}$ (heteroring, benzothiazole); 1104 and 720 cm$^{-1}$ (def. of imide).

Example 3

Synthesis of Second Order NLO Polyimide Polymer PI-3 (in which $R_1$ is COOH, z=60%, and R=p-nitrophenyl)

1. Preparation of Intermediate Polyimide Polymer 3A (in which $R_1$ is —COOH, z=60%, and R=p-nitrophenyl)

The intermediate polyimide polymer 3A was prepared substantially according to the same procedures set forth above in the preparation of the intermediate polyimide polymer 1A, with the exceptions that the host polyimide polymer III obtained in Preparative Example 6 was used and that the used amount of 2,5-bis[(2-cyanoethyl)sulfanyl]-N-(4-nitrobenzoyl)-1,4-phenylenediamine was reduced by 60 mol %. Yield=99.7%.

Detected Properties of the Intermediate Polyimide Polymer 3A:

IR (KBr): 3347 cm$^{-1}$ (N—H); 2250 cm$^{1}$ (CN); 1784 and 1731 cm$^{-1}$ (C=O of imide); 1682 cm$^{-1}$ (C=0 of amide); 1528 cm$^{-1}$ (N—H bending str. of amide and asym. str. of NO$_2$); 1360 cm$^{-1}$ (C—N—C of imide and sym. str. of NO$_2$); 1108 and 721 cm$^{-1}$ (def. of imide).

2. Preparation of Second Order NLO Polyimide Polymer PI-3 (in which R$_1$ is —COOH, z=60%, and R=p-nitrophenyl)

Thin films composed of the second order NLO polyimide polymer PI-3 were formed from a solution containing the intermediate polyimide polymer 3A dissolved in NMP substantially according to the same procedures set forth above in the preparation of the second order NLO polyimide polymer PI-1.

Detected Properties of the Second Order NLO Polyimide Polymer PI-3:

IR (KBr): 1785 and 1731 cm$^{-1}$ (C=O of imide); 1527 cm$^{-1}$ (asym.-str. of NO$_2$); 1358 cm$^{-1}$ (C—N—C of imide and sym. str. of NO$_2$); 1625, 1388, 1298, 1043, 850 and 689 cm$^{-1}$ (heteroring, benzothiazole); 1107 and 720 cm$^{-1}$ (def. of imide).

Example 4

Synthesis of Second Order NLO Polyimide Polymer PI-4 (in which R$_1$ is —COOH, z=0, and R=p-nitrostyryl)

1. Preparation of Intermediate Polyimide Polymer 4A (in which R$_1$ is —COOH, z=0, and R=p-nitrostyryl)

The intermediate polyimide polymer 4A was prepared substantially according to the same procedures set forth above in the preparation of the intermediate polyimide polymer 1 A, with the exception that 2,5-bis[(2-cyanoethyl)sulfanyl]-N-(4-nitrobenzoyl)-1,4-phenylenediamine was replaced by N-{4-amino-2,5-bis[(2-cyanoethyl)sulfanyl]-phenyl}-trans-4-nitrocinnamoyl formamide obtained in Preparative Example 2. Yield=95.0%.

Detected Properties of the Intermediate Polyimide Polymer 4A:

IR (KBr): 3347 cm$^{-1}$ (NH); 2250 cm$^{-1}$ (CN); 1785 and 1731 cm$^{-1}$ (C=O of imide); 1667 cm-$^{-1}$ (C=O of amide); 1522 cm$^{-1}$ (NO$_2$); 1357 cm$^{-1}$ (C—N—C of imide and sym. str. of NO$_2$); 1105 and 721 cm$^{-1}$ (def. of imide).

2. Preparation of Second Order NLO Polyimide Polymer PI-4 (in which R$_1$ is —COOH, z=0, and R=p-nitrostyryl)

Thin films composed of the second order NLO polyimide polymer PI-4 were formed from a solution containing the intermediate polyimide polymer 4A dissolved in NMP substantially according to the same procedures set forth above in the preparation of the second order NLO polyimide polymer PI-1.

Detected Properties of the Second Order NLO Polyimide Polymer PI-4:

IR(KBr): 1785 and 1731 cm$^{-1}$ (C=O of imide); 1522 cm$^{-1}$ (asym. str. of NO$_2$); 1357 cm$^{-1}$ (C—N—C of imide and sym. str. of NO$_2$); 1105 and 721 cm$^{-1}$ (def. of imide).

Example 5

Synthesis of Second Order NLO Polyimide Polymer PI-5 (in which R$_1$ is —OH, z=0, and R=p-nitrophenyl)

The second order NLO polyimide polymer PI-5 was prepared according to Synthesis scheme III described above, in which the host polyimide polymer IV obtained in Preparative Example 6 and 2,5bis[(2-cyanoethyl)sulfanyl]-N-(p-hydroxybenzoyl)-N'-(p-nitrobenzoyl)-p-phenylenediamine obtained in Preparative Example 3 were used.

1. Preparation of Intermediate Polyimide Polymer 5A (in which R$_1$ is —OH, z=0, and R=p-nitrophenyl)

0.82 g (1.38 mmol) of the host polyimide polymer IV was thoroughly dissolved in 18.4 mL of NMP under nitrogen purge. The resultant solution was admixed with 0.80 g of triphenylphosphine (PPh$_3$) and 0.83 g of 2,5-bis[(2-cyanoethyl)sulfanyl]-N-(p-hydroxybenzoyl)-N'-(p-nitrobenzoyl)-p-phenylenediamine, followed by the dropwise addition of 0.53 g of diethyl azodicarboxylate (DEAD). The mixture was stirred at room temperature for 48 h, followed by pouring into DI water to result in the formation of a precipitate, which was collected by filtration, washed and dried, giving the desired product in a yield of 83.8%.

Detected Properties of the Intermediate Polyimide Polymer 5A:

IR (KBr): 2254 cm$^{-1}$ (CN); 1667 cm$^{-1}$ (C=O of amide); 1530 cm$^{-1}$ (asy. NO$_2$); 1373 cm$^{-1}$ (sym. NO$_2$); 1350 cm$^{-1}$ (C—N—C of imide).

2. Preparation of Second Order NLO Polyimide Polymer PI-5 (in which R$_1$ is —OH, z=0, and R=p-nitrophenyl)

Thin films composed of the second order NLO polyimide polymer PI-5 were formed from a solution containing the intermediate polyimide polymer 5A dissolved in NMP substantially similar to the procedures set forth above in the preparation of the second order NLO polyimide polymer PI-1.

Detected Properties of the Second Order NLO Polyimide Polymer PI-5:

IR (KBr): 1730 cm$^{-1}$ (C=O); 1487,cm$^{-1}$ (thiazole ring).

Example 6

Synthesis of Second Order NLO Polyimide Polymer PI-6 (in which R$_1$ is —OH, z=0, and R=p-nitrostyryl)

The second order NLO polyimide polymer PI-6 was prepared according to Synthesis scheme III described above, in which the host polyimide polymer IV obtained in Preparative Example 6 and N-[4-(p-hydroxybenzoyl)]-2,5-bis[(2-cyanoethyl)sulfanyl]phenyl]-trans-4-nitrocinnamoyl formamide obtained in Preparative Example 4 were used.

1. Preparation of Intermediate Polyimide Polymer 6A (in which R$_1$ is —OH, z=0, and R=p-nitrostyryl)

0.72 g (0.19 mmol) of the host polyimide polymer IV was thoroughly dissolved in 25.0 mL of NMP under -nitrogen purge. The resultant solution was admixed with 0.65 g of triphenylphosphine (PPh₃) and 0.71 g of N-[4-(p-hydroxybenzoyl)]-2,5-bis[(2-cyanoethyl)sulfanyl]phenyl]-trans-4-nitrocinnamoyl formamide, followed by the dropwise addition of 0.43 g of DEAD. The mixture was stirred at room temperature for 48 h, followed by pouring into DI water to result in the formation of a precipitate, which was collected by filtration, washed and dried, giving the desired product in a yield of 92%.

Detected Properties of the Intermediate Polyimide Polymer 6A:

IR (KBr): 2254 cm$^{-1}$ (CN); 1672 cm$^{-1}$ (C=O of amide); 1534 and 1344 cm$^{-1}$ (NO$_2$).

2. Preparation of Second Order NLO Polyimide Polymer PI-6 (in which R$_1$ is —OH, z=0, and R=p-nitrostyryl)

Thin films composed of the second order NLO polyimide polymer PI-6 were formed from a solution containing the intermediate polyimide polymer 6A dissolved in NMP substantially similar to the procedures set forth above in the preparation of the second order NLO polyimide polymer PI-1.

Detected Properties of the Second Order NLO Polyimide Polymer PI-6:

IR (KBr): 1730 cm$^{-1}$ (C=O); 1487 cm$^{-1}$ (thiazole ring).

Example 7

Synthesis of Second Order NLO Polyimide Polymer PI-7 (in which y and z are zero, and R=p-nitrophenyl)

The second order NLO polyimide polymer PI-7 was prepared according to Synthesis scheme IV described above, in which 5-{6-(4-nitrophenyl)benzo[1,2-d ;4,5-d']bisthiazol-2-yl}benzene-1,3-diamine obtained in Preparative Example 5 was reacted with 6FDA to result in the formation of an intermediate polyamic acid, which was subsequently cured by heating.

0.126 g of 5-{6-(4-nitrophenyl)benzo[1,2-d;4,5-d']bisthiazol-2-yl}benzene-1,3-diamine was dissolved in 1.7 mL of NMP at room temperature under nitrogen purge, followed by the addition of 6FDA (0.133 g, 0.3 mmol) at 0~5° C. The resultant mixture was stirred at 0~5° C. for 4 h and at room temperature for 24 h.

The thus-obtained solution, which contained an intermediate polyamic acid of formula (II') in which R is p-nitrophenyl, was spin-coated onto ITO glasses and petri dishes, followed by heating at 300° C. under vacuum for 2 h, so as to result in a ring-closing reaction on the backbone chain of the intermediate polyamic acid. Finally, thin films of the polyimide polymer PI-7 were obtained.

Detected Properties of the Second Order NLO Polyimide Polymer PI-7:

IR (KBr): 1784 and 1728 cm$^{-1}$ (C=O of imide); 1525 cm$^{-1}$ (asym. str. of NO$_2$); 1352 cm$^{-1}$ (C—N—C of imide and sym. str. of NO$_2$); 1630 (as shoulder), 1390, 1299,1043, 892 and 690 cm$^{-1}$ (heteroring, benzothiazole); 1100 and 722 cm$^{-1}$ (def. of imide).

Results and Discussion:

The above-prepared polyimide polymers were subjected to a variety of tests according to the procedures set forth in the previous section of "Measurements," so as to determine the properties thereof. The obtained experimental results are summarized below.

1. Solubility Behavior:

Six different organic solvents, including chloroform, dimethyl sulfoxide (DMSO), tetrahydrofuran (THF), N-methylpyrrolidone (NMP), trifluoroacetic acid (TFA) and methanesulfonic acid (MSA), were selected to test the solubility behaviors of the polyimide polymers prepared in the above examples. The obtained results are shown in Table 1, in which ++: soluble at room temperature; +: soluble after heating; +−: partially soluble after heating (judged by the color of solution); and ×: insoluble even after heating.

TABLE 1

Solubility behaviors of polyimide polymers.

| Polymer | Chloroform | THF | DMSO | NMP | TFA | MSA |
|---|---|---|---|---|---|---|
| M | × | × | +− | + | ++ | ++ |
| I | × | +− | + | + | ++ | ++ |
| 1A | × | +− | ++ | ++ | ++ | ++ |
| PI-1 | × | × | × | +− | + | ++ |
| II | × | × | + | + | ++ | ++ |
| 2A | × | +− | + | ++ | ++ | ++ |
| PI-2 | × | × | × | +− | + | ++ |
| III | × | × | + | + | ++ | ++ |
| 3A | × | +− | + | ++ | ++ | ++ |
| PI-3 | × | × | +− | +− | + | ++ |
| 4A | × | +− | ++ | ++ | ++ | ++ |
| PI-4 | × | × | × | +− | + | ++ |
| IV | × | +− | + | + | ++ | ++ |
| 6A | × | +− | ++ | ++ | ++ | ++ |
| PI-6 | × | × | × | +− | + | ++ |

It can be seen from Table 1 that the intermediate polyimide polymers 1A, 2A, 3A, 4A and 6A produced according to this invention exhibit good solubility behaviors, especially in NMP. Hence, these intermediate polyimide polymers can be successfully used to form polyimide thin films without the problem of precipitate interference, promising their use(s) in the industry.

As for the lower solubility of the final polyimide polymers PI-1, PI-2, PI-3, PI-4 and PI-6 than their intermediate polyimide polymers 1A, 2A, 3A, 4A and 6A, respectively, a possible reason may be that curing the intermediate polyimide polymers 1A, 2A, 3A, 4A and 6A by heating resulted in a ring-closing reaction (i.e., cyclization of benzobisthiazole) upon the grafted pendant groups thereof, so that the resultant products PI-1, PI-2, PI-3, PI-4 and PI-6 have increased rigidity and -decreased degree of freedom, thereby lowering the solubility thereof. However, this will not undesirably affect the industrial use(s) of the second order NLO polyimide polymers according to this invention since they are still soluble in some organic solvents. In addition, as described below, the second order NLO polyimide polymers according to this invention exhibit excellent thermal and chemical resistance.

2. Inherent Viscosity ($\eta_{inh}$):

Inherent viscosities of polyimides were determined at a concentration of 0.5 g/dL in NMP by using an Ubbelohde viscometer at 30° C. The obtained results are summarized in Table 2.

It can be seen from Table 2 that intermediate polyimide polymers 1A, 2A, 3A, 4A, 5A and 6A have an inherent viscosity greater than 0.3 dL/g, respectively, which favor their subsequent use(s) in manufacturing thin films of polyimide polymers according to this invention. In addition, PI-1 films exhibited fair flexibility, suggesting a fair molecular weight obtained.

3. Thermal Properties:

Polyimides are well known as excellent heat resistant polymers but with poor processability. Incorporation of $CF_3$ groups in the PI backbone may improve its solubility, and thus the processability, but at the expense of reduced thermal properties.

The thermal properties of polyimide polymers according to this invention are summarized in Table 2.

3.1 Glass Transition Temperature ($T_g$):

It can be seen from Table 2 that each of polyimide polymers PI-1, PI-2, PI-3, PI-4, PI-5 and PI-6 has a glass transition temperature ($T_g$) higher than or proximate to 300° C. and, thus, can fully meet the requirement for subsequent application(s) in the electro-optics industry (i.e., $T_g$>200° C.).

3.2 Thermal Decomposition Temperature:

Host polyimide polymer I has the lowest thermal decomposition temperature ($T_d$) of 549° C. at 10% weight loss as compared to host polyimide polymer II ($T_d$=555° C.), III ($T_d$=562° C.), and polyimide polymer M ($T_d$=619° C.). These results indicate that carboxylic acids decomposed first during the heating, such that $T_d$ increases while COOH groups decrease in these polyimide polymers. Due to amide linkages, cyanoethyl chains and nitro groups in the pendant groups of the intermediate polyimide polymers 1A, 2A and 3A, the decomposition was initiated at lower temperatures from the breakage of cyanoethyl chains, amide or nitro groups. The formation of benzobisthiazole-based pendant groups in the final polyimide polymers PI-1, PI-2 and PI-3 reinforced the thermal stability again and even performed better than the intermediate polyimide polymers 1A, 2A and 3A for the higher char yield at 800° C.

However, the nitro groups ($NO_2$) of the benzobisthiazole-based pendant groups are the weakest parts for thermal resistance and they decomposed firstly during the heating. This assumption was evidenced by checking the decomposition temperatures at 10% weight loss in TGA, i.e., 554 ° C. for PI-1, 568 ° C. for PI-2, and 575 ° C. for PI-3, the $T_d$ being disproportional to the number of benzobisthiazole-derived chromophores (i.e. the nitro groups).

Finally, polyimide polymer M exhibits the best thermal property than the other polyimides because there are no side groups.

Likewise, due to the ether linkages, cyanoethyl chains and nitro groups in the pendant groups of the intermediate polyimide polymers 5A and 6A, the decomposition was initiated at lower temperatures from the breakage of cyanoethyl chains, ether linkages or nitro groups. The formation of benzobisthiazole-based pendant groups in the final polyimide polymers PI-5 and PI-6 reinforced the thermal stability again and even performed better than the intermediate polyimide polymers 5A and 6A for the higher char yield at 800° C.

It can be seen from Table 2 that each of polyimide polymers PI-1, PI-2, PI-3, PI-4, PI-5 and PI-6 has a thermal decomposition temperature far higher than 250° C.

In view of the aforesaid, the second order NLO polyimide polymers according to this invention exhibit excellent thermal properties and are expected to exist with long term thermal stability.

4. Optical Properties:

The UV-vis absorption spectral features of the polyimide polymers (detected in MSA and from film) are shown in Table 2.

The aromatic absorption of the polyimide backbone was at around 261 nm. The high resonance of benzobisthiazole-based chromophore was evidenced by the new absorption at around 360 nm in UV-vis spectra. The observed absorption shift from an intermediate polyimide polymer to its corresponding final polyimide polymer indicates the successful formation of benzobisthiazole rings in the final polyimide polymer from the intermediate polyimide polymer during curing at high temperature. In addition, the PI backbone chain acts as an electron donor and the nitro groups of the benzobisthiazole-based pendant groups act as an electron acceptor.

5. Electrooptic Effect:

The electrooptic effect of polyimide polymers PI-1, PI-2, and PI-3 were evaluated using an ellipsometric method with in-situ poling according to Yoshito Shuto et al. (1995), *J. Appl. Phys.*, 77 (9): 4632-4638. The electrooptic coefficient, $r_{33}$, was calculated according to the following equation, $$r_{33} = \left(\frac{3\lambda}{4\pi n^2}\right)\left(\frac{I_m}{I_c V_m}\right)\frac{(n^2 - \sin^2\theta)^{1/2}}{\sin^2\theta}$$

wherein λ is the wavelength of laser beam; n is the refractive index of the polymer film; $I_c$ is the half-intensity; $I_m$ is the modulated beam intensity; and θ is the incident angle.

The measurement of $r_{33}$ with in-situ poling was conducted at different poling voltages and temperatures to seek the maximum intensity of $I_m$. For PI-1 film, $I_c$ was first measured as 155 mV, then the poling temperatures were applied from 250 to 300° C. and the poling voltage was first kept at 100 V. The maximum $I_m$ was found at 300° C. with an applied $V_m$ of 5 V (The higher temperature could not be used due to the limits of the poling system). Next, the poling voltage was increased from 100 V to 320 V at 300° C. and held at each poling voltage for 10 minutes. Finally, the PI-1 film broke down at 320 V. The maximum $r_{33}$ value for PI-1 film was calculated as 5.3 pm/V at 200 V ($I_m$=0.283 mV, $V_m$=5 V).

FIG. 1 shows the variation of the $r_{33}$ value of a spin-coated thin film made of polyimide polymer PI-1 in response to the increase of poling voltage.

Figure 2:
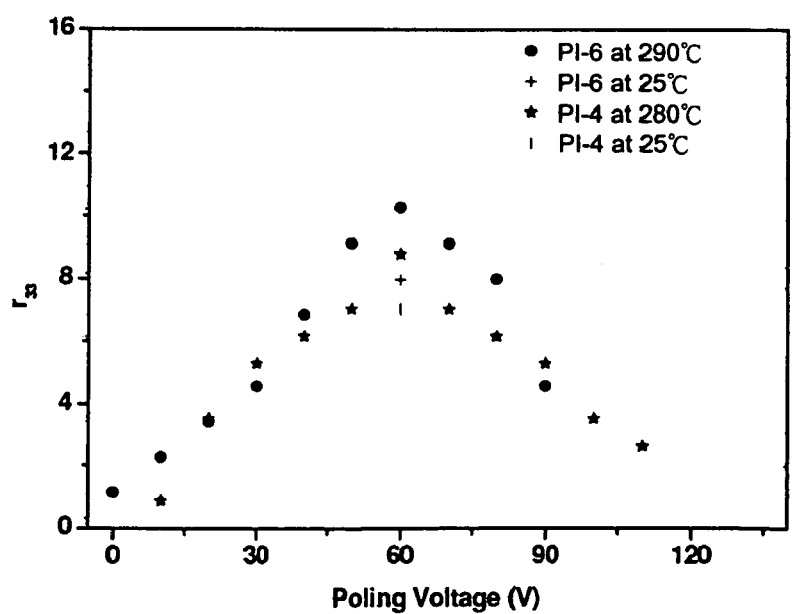
FIG. 2 plots the variations of the electrooptic coefficients ($r_{33}$) of spin-coated thin films made of polyimide polymers PI-4 and PI-6, respectively, in response to increasing poling voltage and temperature.

FIG. 2 shows the variations of the $r_{33}$ values of spin-coated thin films made of polyimide polymers PI-4 and PI-6, respectively, in response to the increase of poling voltage and temperature, in which the maximum $r_{33}$ value for PI-4 film was calculated as 7.04 pm/V at 60 V, and the maximum $r_{33}$ value for PI-6 film was calculated as 7.99 pm/V at 60 V.

Figure 3:
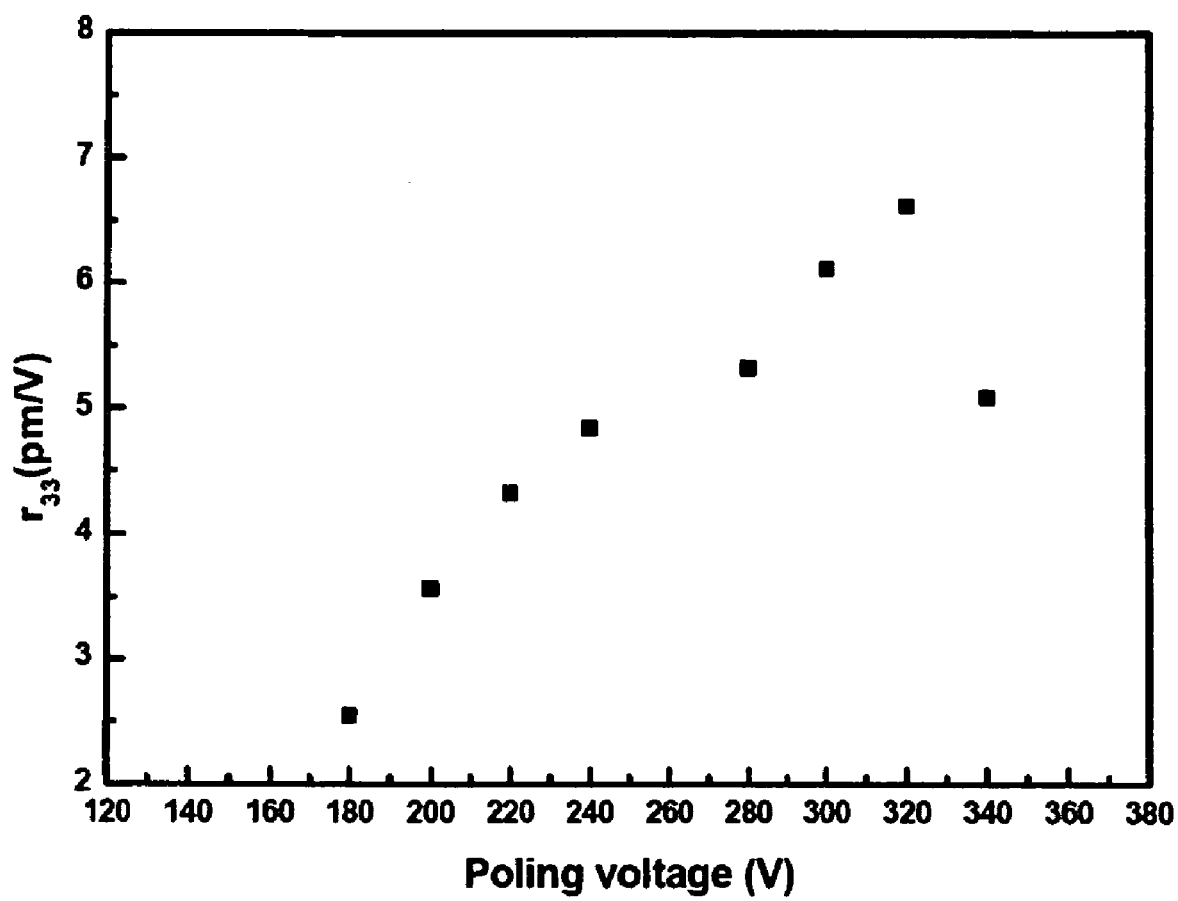
FIG. 3 plots the variation of the electrooptic coefficient ($r_{33}$) of a spin-coated thin film made of polyimide polymer PI-5 in response to increasing poling voltage.

FIG. 3 shows the variation of the $r_{33}$ value of a spin-coated thin film made of polyimide polymer PI-5 in response to the increase of poling voltage, in which the maximum $r_{33}$ value for PI-5 film was calculated as 6.62 pm/V at 320 V.

In view of the aforesaid, the second order NLO polyimide polymers obtained according to this invention were found to exhibit excellent thermal properties and satisfactory solubility and viscosity, while having an electro-optic coefficient higher than that generally required for electro-optics to date, i.e., $r_{33}$>3 pm/V.

Therefore, it is contemplated that the second order NLO polyimide polymers obtained according to this invention can be further developed for use in the manufacture of electro-optic (EO) devices, such as electro-optic waveguide devices.

TABLE 2

Properties of polyimide polymers.

| Polymer | DABA/m-PDA[a] | $\eta_{inh}$[b] (dL/g) | $T_g$ (°C) | $T_{d1}$ (°C)[c] (wt %) | $T_{d2}$ (°C)[c] (wt %) | $T_{5\%}/T_{10\%}$ (°C)[d] | Char Yield at 800°C (%) | Refractive index (n)/ wavelength (nm) | Thickness of film (μm) | $r_{33}$ (pm/V) | $\lambda_{max}$ (nm) in UV In MSA | $\lambda_{max}$ (nm) in UV Film |
|---|---|---|---|---|---|---|---|---|---|---|---|---|
| M | 0.0/1.0 | 0.55 | 310 | 575 (99.0) | — | 589/619 | 57.8 | — | — | — | 235 | — |
| I | 1.0/0.0 | 0.57 | 306 | 437 (99.5) | 581 (88.4) | 485/549 | 48.5 | — | — | — | 253/301 | 249 |
| 1A | 1.0/0.0 | 0.73 | — | 322 (97.4) | 558 (79.4) | 336/373 | 48.4 | — | — | — | 257 | 310 |
| PI-1 | 1.0/0.0 | — | 324 | 432 (99.0) | 560 (94.0) | 487/554 | 59.2 | 1.462/633 1.480/830 | 1.49 | 5.30 | 261/359 | 405 |
| II | 0.7/0.3 | 0.45 | 297 | 458 (99.5) | 570 (89.3) | 501/555 | 44.5 | — | — | — | 253/301 | — |
| 2A | 0.7/0.3 | 0.53 | — | 211 (99.9) | 564 (76.0) | 256/302 | 47.9 | — | — | — | 255 | — |
| PI-2 | 0.7/0.3 | — | 339 | 369 (99.9) | 561 (92.7) | 494/568 | 58.0 | 1.433/633 1.454/830 | 1.11 | — | 261/359 | 382 |
| III | 0.4/0.6 | 0.52 | 300 | 459 (99.6) | 568 (90.4) | 502/562 | 49.4 | — | — | — | 249/301 | — |
| 3A | 0.4/0.6 | 0.56 | — | 223 (99.9) | 568 (78.2) | 275/333 | 47.3 | — | — | — | 254 | — |
| PI-3 | 0.4/0.6 | — | 316 | 383 (99.9) | 566 (92.9) | 502/575 | 56.6 | 1.403/633 1.387/830 | 1.02 | — | 255/301/355 | 371 |
| 4A | 1.0/0.0 | 0.60 | — | 229 | 540 | — | 45 | — | — | — | 238/309 | 315 |
| PI-4 | 1.0/0.0 | — | 292 | 370 | 532 | — | 62 | 1.71/830 | 1.3 | 7.04 | 249/389 | 389 |
| IV | 1.0/0.0 | 0.493 | 347 | 447 | 547 | — | 36 | — | — | — | 235/301 | 303 |
| 5A | 1.0/0.0 | 0.415 | — | 209 | 570 | — | 44.71 | — | — | — | 220/270 | 340 |
| PI-5 | 1.0/0.0 | — | 324 | 355 | 576 | — | 51.32 | 1.55/630 1.53/830 | 1.1 | 6.62 | 220/390 | 425 |
| 6A | 1.0/0.0 | 0.398 | — | 286 | 536 | — | 42 | — | — | — | 224/313 | 321 |
| PI-6 | 1.0/0.0 | — | 327 | 376 | 547 | — | 58 | 1.48/830 | 1.1 | 7.99 | 253/394 | 418 |

[a]The molar ratio of DABA/m-PDA used to form the backbone chain of polyimide polymer.
[b]Concentration C = 0.50 g/dL, measured at 30° C. in NMP.
[c]Determined by the on-set point from TGA traces.
[d]$T_{5\%}$ and $T_{10\%}$ are the decomposition temperatures at 5% and 10% weight loss, respectively.

All patents and literature references cited in the present specification as well as the references described therein, are hereby incorporated by reference in their entirety. In case of conflict, the present description, including definitions, will prevail.

While the invention has been described with reference to the above specific embodiments, it is apparent that numerous modifications and variations can be made without departing from the scope and spirit of this invention. It is therefore intended that this invention be limited only as indicated by the appended claims.

We claim:

1. A second order nonlinear optic polyimide polymer comprising repeating units represented by the formula:

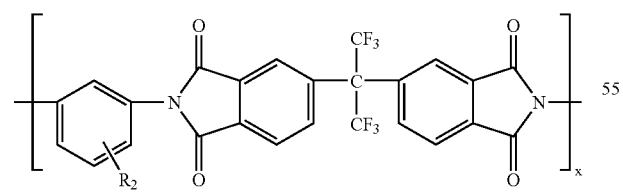

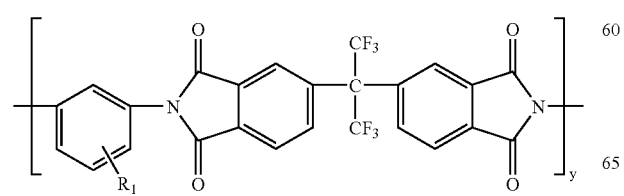

-continued

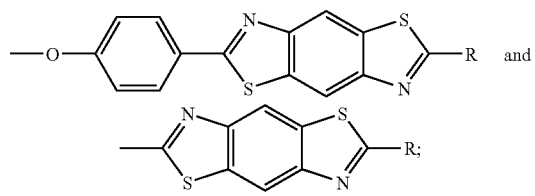

wherein:

$R_1$ is a functionality group selected from —OH and —COOH;

$R_2$ is a group represented by the formula selected from

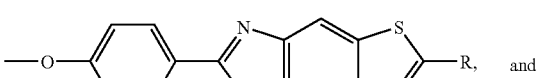

wherein when $R_1$ is —OH, $R_2$ is a group represented by the formula:

when $R_1$ is —COOH, $R_2$ is a group represented by the formula:

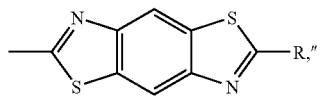

wherein R is a phenyl or styryl group that is 3-substituted with a group selected from the —NO$_2$, —COCH$_3$, —CN, —SO$_2$NH$_2$, Br and Cl; and x+y+z=100% of the repeating units, x is at least 1%, and either or both of y and z can be zero.

2. A second order nonlinear optic polyimide polymer according to claim 1, comprising repeating units represented by the formula:

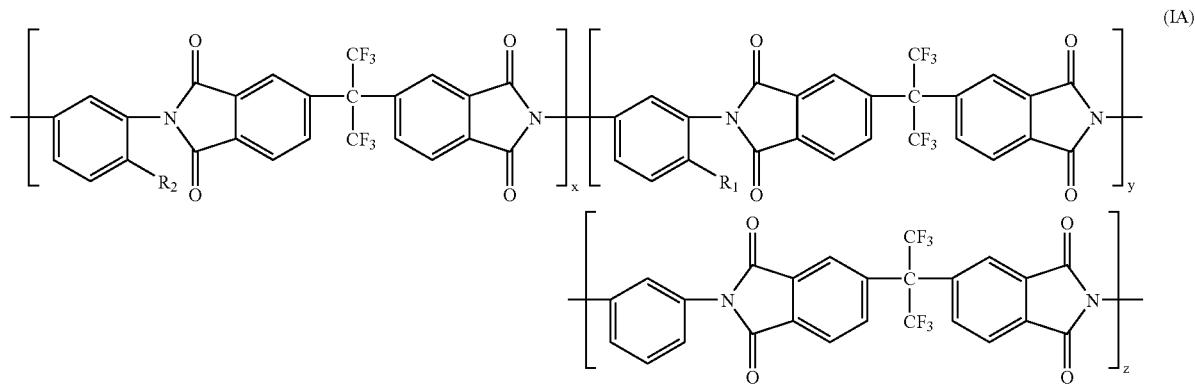

wherein R$_1$ is —OH.

3. A second order nonlinear optic polyimide polymer according to claim 2, wherein z is zero, and R is a p-nitrophenyl group.

4. A second order nonlinear optic polyimide polymer according to claim 2, wherein z is zero, and R is a p-nitrostyryl group.

5. A second order nonlinear optic polyimide polymer according to claim 1, comprising repeating units represented by the formula:

6. A second order nonlinear optic polyimide polymer according to claim 5, wherein both y and z are zero, and R is a p-nitrophenyl group.

7. A second order nonlinear optic polyimide polymer according to claim 5, wherein both y and z are zero, and R is a p-nitrostyryl group.

8. A second order nonlinear optic polyimide polymer according to claim 5, wherein z=30%, and R is a p-nitrophenyl group.

9. A second order nonlinear optic polyimide polymer according to claim 5, wherein z=60%, and R is a p-nitrophenyl group.

10. A polyimide polymer comprising repeating units represented by the formula

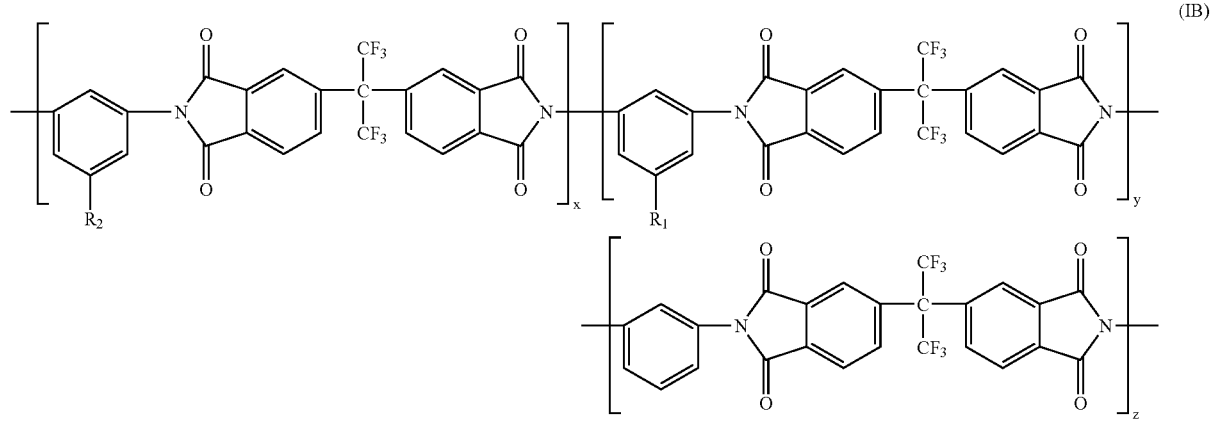

wherein R$_1$ is —COOH.

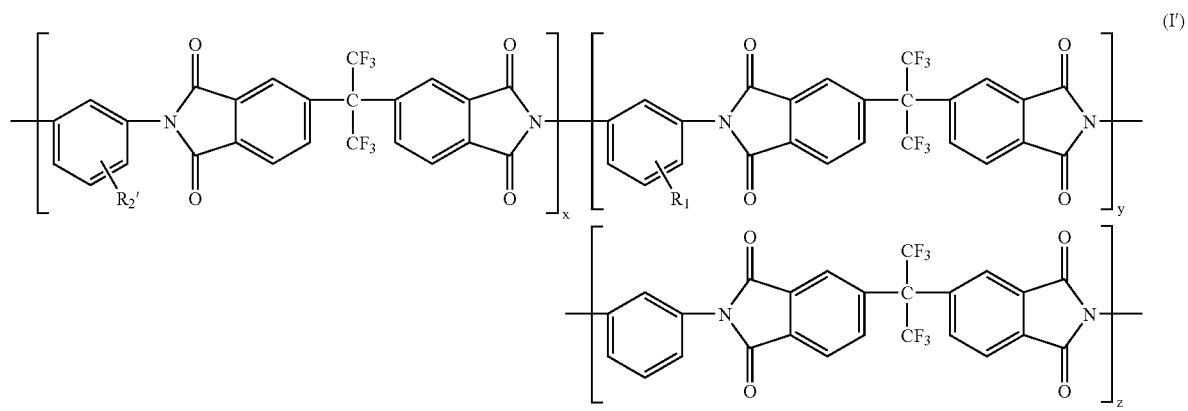

(I')

wherein:

$R_1$ is a functionality group selected from —OH and —COOH;

when $R_1$ is —OH, $R_2'$ is a group represented by the formula:

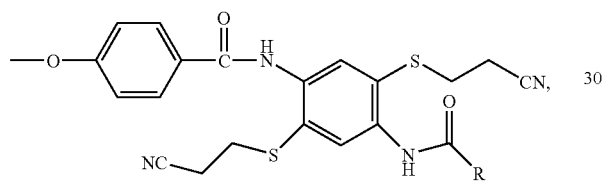

when $R_1$ —COOH, $R_2'$ is a group represented by the formula:

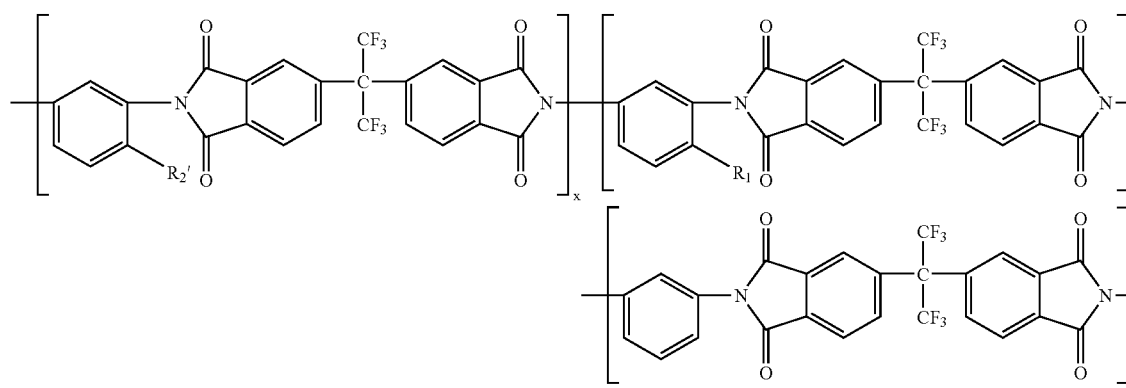

wherein R is a phenyl or styryl group that is 3-substituted with a group selected from —NO$_2$, —COCH$_3$, —CN, —SO$_2$NH$_2$, Br and Cl; and x+y+z=100% of the repeating units, x is at least 1%, and either or both of y and z can be zero.

11. A polyimide polymer according to claim 10, comprising repeating units represented by the formula:

(IA')

wherein $R_1$ is —OH.

12. A polyimide polymer according to claim 11, wherein z is zero, and R is a p-nitrophenyl group.

13. A polyimide polymer according to claim 11, wherein z is zero, and R is a p-nitrostyryl group.

14. A polyimide polymer according to claim 10, comprising repeating units represented by the formula:

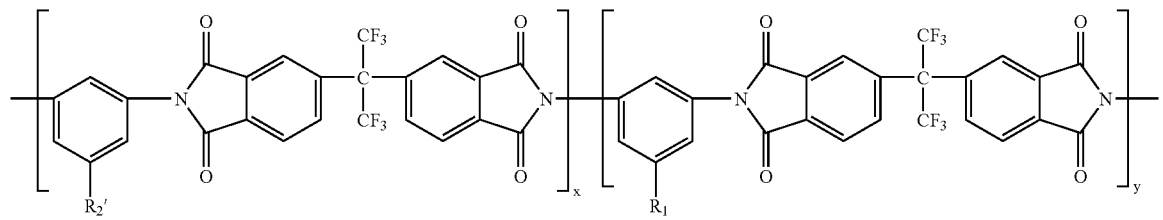

wherein $R_1$ is —COOH.

15. A polyimide polymer according to claim 14, wherein both y and z are zero, and R is a p-nitrophenyl group.

16. A polyimide polymer according to claim 14, wherein both y and z are zero, and R is a p-nitrostyryl group.

17. A polyimide polymer according to claim 14, wherein z=30%, and R is a p-nitrophenyl group.

18. A polyimide polymer according to claim 14, wherein z=60%, and R is a p-nitrophenyl group.

19. A compound of formula (C1):

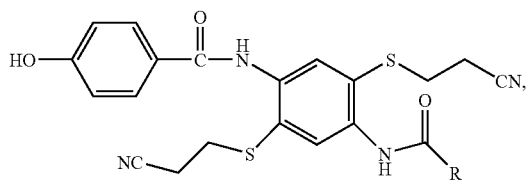

wherein R is a phenyl or styryl group that is 3-substituted with a group selected from —$NO_2$, —$COCH_3$, —CN, —$SO_2NH_2$, Br and Cl.

20. A compound according to claim 19, wherein R is a p-nitrophenyl group.

21. A compound according to claim 19, wherein R is a p-nitrostyryl group.

22. A compound of formula (C2):

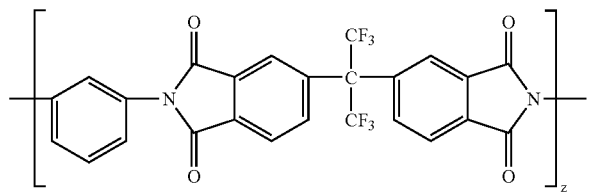

wherein R is a phenyl or styryl group that is 3-substituted with a group selected from —$NO_2$, —$COCH_3$, —CN, —$SO_2NH_2$, Br and Cl.

23. A compound according to claim 22, wherein R is a p-nitrophenyl group.

24. A compound according to claim 22, wherein R is a p-nitrostyryl group.

25. A compound of formula (C3):

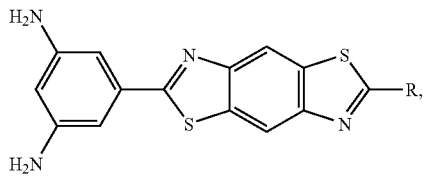

wherein R is a phenyl or styryl group that is 3-substituted with a group selected from —$NO_2$, —$COCH_3$, —CN, —$SO_2NH_2$, Br and Cl.

26. A compound according to claim 25, wherein R is a p-nitrophenyl group.

27. A compound according to claim 25, wherein R is a p-nitrostyryl group.

28. A second order nonlinear optic polyimide polymer comprising repeating units represented by the formula (II):

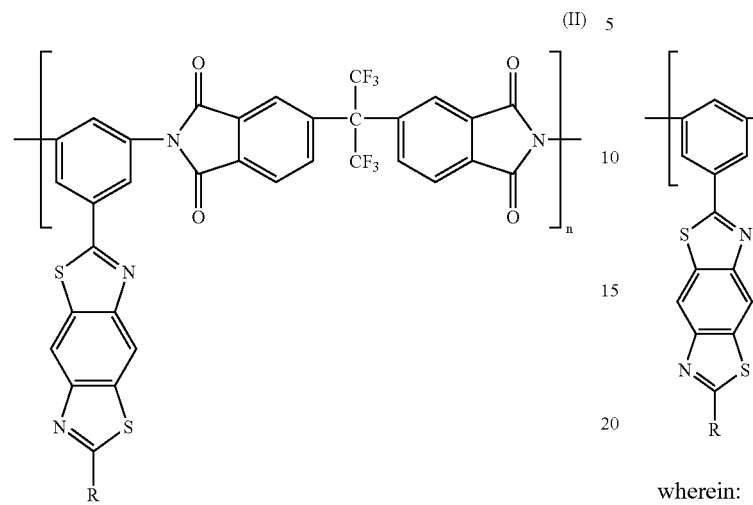

wherein:
R is a phenyl or styryl group that is 3-substituted with a group selected from —NO$_2$, —COCH$_3$, —CN, —SO$_2$NH$_2$, Br and Cl; and n is an integer greater than 1.

29. A second order nonlinear optic polyimide polymer according to claim 28, wherein R is a p-nitrophenyl group.

30. A second order nonlinear optic polymer according to claim 28, wherein R is a p-nitrostyryl group.

31. A polyamic acid comprising repeating units represented by the formula (II'):

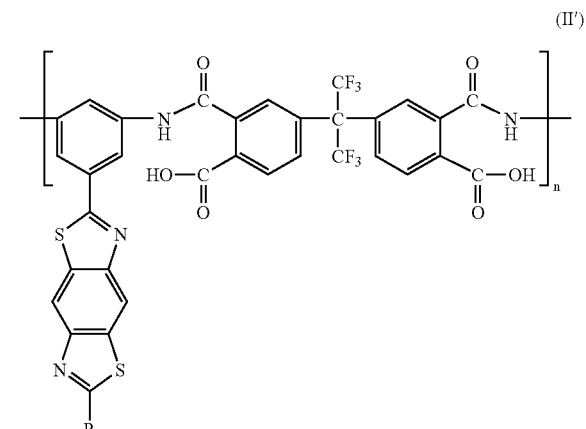

wherein:
R is a phenyl or styryl group that is 3-substituted with a group selected from —NO$_2$, —COCH$_3$, —CN, —SO$_2$NH$_2$, Br and Cl; and
n is an integer greater than 1.

32. A polyamic acid according to claim 31, wherein R is a p-nitrophenyl group.

33. A polyamic acid according to claim 31, wherein R is a p-nitrostyryl group.

* * * * *